(12) United States Patent
Suzuki

(10) Patent No.: US 7,751,846 B2
(45) Date of Patent: Jul. 6, 2010

(54) MOBILE STATION APPARATUS AND TRANSMISSION POWER CONTROL METHOD FOR THE SAME APPARATUS

(75) Inventor: Masaaki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 657 days.

(21) Appl. No.: 11/704,319

(22) Filed: Feb. 9, 2007

(65) Prior Publication Data
US 2007/0191053 A1    Aug. 16, 2007

(30) Foreign Application Priority Data
Feb. 16, 2006    (JP)    ............... 2006-039790

(51) Int. Cl.
*H04Q 7/20*    (2006.01)
(52) U.S. Cl. ............... 455/522; 455/69; 455/127.1; 455/67.11; 455/500; 455/511; 370/310; 370/343; 370/328
(58) Field of Classification Search ............... 455/522, 455/69, 127.1, 550.1, 67.11, 426.1, 426.2, 455/524, 511, 525, 422.1, 403, 500, 517; 370/310, 343, 328
See application file for complete search history.

(56) References Cited

U.S. PATENT DOCUMENTS

| | | | |
|---|---|---|---|
| 6,463,296 B1 | 10/2002 | Esmailzadeh et al. | |
| 2003/0045318 A1* | 3/2003 | Subrahmanya | ............... 455/522 |
| 2003/0181163 A1 | 9/2003 | Ofuji et al. | |
| 2004/0005906 A1* | 1/2004 | Okumura et al. | ............... 455/522 |
| 2006/0046765 A1* | 3/2006 | Kogure | ............... 455/522 |

FOREIGN PATENT DOCUMENTS

| | | |
|---|---|---|
| JP | 2003-78480 | 3/2003 |
| JP | 2003-235072 | 8/2003 |
| WO | 2002-537712 | 11/2002 |

OTHER PUBLICATIONS

"Third Generation Partnership Project; Technical Specification Group Radio Access Network; Physical Layer Procedures (FDD) (Release 6)," *3GPP TS 25.214*, V6.7.1, Technical Specification, Dec. 12, 2005.

"Third Generation Partnership Project; Technical Specification Group Radio Access Network; User Equipment (UE) Radio Transmission and Reception (FDD) (Release 7)," *3GPP TS 25.101*, V7.2.0, Technical Specification, Dec. 22, 2005.

* cited by examiner

*Primary Examiner*—Keith T Ferguson
(74) *Attorney, Agent, or Firm*—Fujitsu Patent Center

(57) ABSTRACT

The present invention relates to a mobile station apparatus and a transmission power control method for the same apparatus, capable of improving the decision accuracy in a mobile station with respect to a TPC command from a base station to the mobile station and of maintaining the optimum transmission power. In the mobile station which is made to control the transmission power to the base station on the basis of a TPC command received from the base station, a plurality of TPC commands received from a plurality of base stations are weighting-combined so as to control the transmission power to the base stations on the basis of a result of the weighting combination.

20 Claims, 16 Drawing Sheets

FIG. 3

| MODE | SIR Factor ON/OFF | Serving Cell Detection ON/OFF | Soft Combining Result #1 (Serving Cell) | Soft Combining Result #2 | SIR Mesurment Result #1 | SIR Mesurment Result #2 | Weight1 $\alpha 1$ | Weight2 $\alpha 2$ |
|---|---|---|---|---|---|---|---|---|
| 1 | OFF | OFF | P1 | P2 | S1 | S2 | W1 | W2 |
| 2 | OFF | ON | P1 | P2 | S1 | S2 | $\beta$ | W2 |
| 3 | ON | OFF | P1 | P2 | S1 | S2 | $S1*\gamma 1$ | $S2*\gamma 2$ |
| 4 | ON | ON | P1 | P2 | S1 | S2 | $\beta*(S1*\gamma 1)$ | $S2*\gamma 2$ |

$\beta$ : Serving Cell Weight Ratio $\gamma$ : SIR Weight Ratio

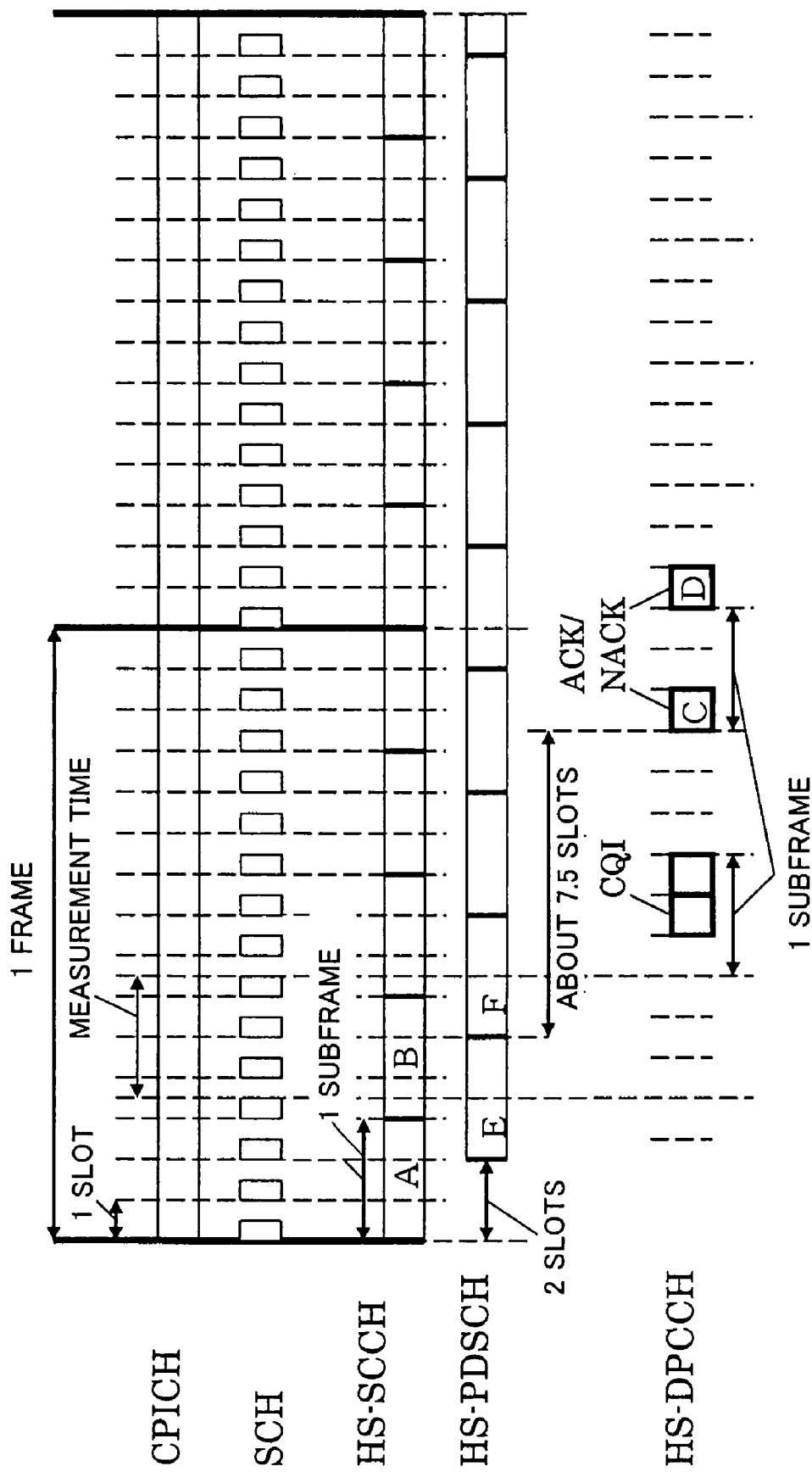

FIG. 9

Table 11: DPDCH and DPCCH fields

| Slot Format #i | Channel Bit Rate (kbps) | Channel Symbol Rate (ksps) | SF | Bits/ Slot | DPDCH Bits/Slot | | DPCCH Bits/Slot | | | Transmitted slots per radio frame $N_{Tr}$ |
|---|---|---|---|---|---|---|---|---|---|---|
| | | | | | $N_{Data1}$ | $N_{Data2}$ | $N_{TPC}$ | $N_{TFCI}$ | $N_{Pilot}$ | |
| 0 | 15 | 7.5 | 512 | 10 | 0 | 4 | 2 | 0 | 4 | 15 |
| 0A | 15 | 7.5 | 512 | 10 | 0 | 4 | 2 | 0 | 4 | 8-14 |
| 0B | 30 | 15 | 256 | 20 | 0 | 8 | 4 | 0 | 8 | 8-14 |
| 1 | 15 | 7.5 | 512 | 10 | 0 | 2 | 2 | 2 | 4 | 15 |
| 1B | 30 | 15 | 256 | 20 | 0 | 4 | 4 | 4 | 8 | 8-14 |
| 2 | 30 | 15 | 256 | 20 | 2 | 14 | 2 | 0 | 2 | 15 |
| 2A | 30 | 15 | 256 | 20 | 2 | 14 | 2 | 0 | 2 | 8-14 |
| 2B | 60 | 30 | 128 | 40 | 4 | 28 | 4 | 0 | 4 | 8-14 |
| 3 | 30 | 15 | 256 | 20 | 2 | 12 | 2 | 2 | 2 | 15 |
| 3A | 30 | 15 | 256 | 20 | 2 | 10 | 2 | 4 | 2 | 8-14 |
| 3B | 60 | 30 | 128 | 40 | 4 | 24 | 4 | 4 | 4 | 8-14 |
| 4 | 30 | 15 | 256 | 20 | 2 | 12 | 2 | 0 | 4 | 15 |
| 4A | 30 | 15 | 256 | 20 | 2 | 12 | 2 | 0 | 4 | 8-14 |
| 4B | 60 | 30 | 128 | 40 | 4 | 24 | 4 | 0 | 8 | 8-14 |
| 5 | 30 | 15 | 256 | 20 | 2 | 10 | 2 | 2 | 4 | 15 |
| 5A | 30 | 15 | 256 | 20 | 2 | 8 | 2 | 4 | 4 | 8-14 |
| 5B | 60 | 30 | 128 | 40 | 4 | 20 | 4 | 4 | 8 | 8-14 |
| 6 | 30 | 15 | 256 | 20 | 2 | 8 | 2 | 0 | 8 | 15 |
| 6A | 30 | 15 | 256 | 20 | 2 | 8 | 2 | 0 | 8 | 8-14 |
| 6B | 60 | 30 | 128 | 40 | 4 | 16 | 4 | 0 | 16 | 8-14 |
| 7 | 30 | 15 | 256 | 20 | 2 | 6 | 2 | 2 | 8 | 15 |
| 7A | 30 | 15 | 256 | 20 | 2 | 4 | 2 | 4 | 8 | 8-14 |
| 7B | 60 | 30 | 128 | 40 | 4 | 12 | 4 | 4 | 16 | 8-14 |
| 8 | 60 | 30 | 128 | 40 | 6 | 28 | 2 | 0 | 4 | 15 |
| 8A | 60 | 30 | 128 | 40 | 6 | 28 | 2 | 0 | 4 | 8-14 |
| 8B | 120 | 60 | 64 | 80 | 12 | 56 | 4 | 0 | 8 | 8-14 |
| 9 | 60 | 30 | 128 | 40 | 6 | 26 | 2 | 2 | 4 | 15 |
| 9A | 60 | 30 | 128 | 40 | 6 | 24 | 2 | 4 | 4 | 8-14 |
| 9B | 120 | 60 | 64 | 80 | 12 | 52 | 4 | 4 | 8 | 8-14 |
| 10 | 60 | 30 | 128 | 40 | 6 | 24 | 2 | 0 | 8 | 15 |
| 10A | 60 | 30 | 128 | 40 | 6 | 24 | 2 | 0 | 8 | 8-14 |
| 10B | 120 | 60 | 64 | 80 | 12 | 48 | 4 | 0 | 16 | 8-14 |
| 11 | 60 | 30 | 128 | 40 | 6 | 22 | 2 | 2 | 8 | 15 |
| 11A | 60 | 30 | 128 | 40 | 6 | 20 | 2 | 4 | 8 | 8-14 |
| 11B | 120 | 60 | 64 | 80 | 12 | 44 | 4 | 4 | 16 | 8-14 |
| 12 | 120 | 60 | 64 | 80 | 12 | 48 | 4 | 8* | 8 | 15 |
| 12A | 120 | 60 | 64 | 80 | 12 | 40 | 4 | 16* | 8 | 8-14 |
| 12B | 240 | 120 | 32 | 160 | 24 | 96 | 8 | 16* | 16 | 8-14 |
| 13 | 240 | 120 | 32 | 160 | 28 | 112 | 4 | 8* | 8 | 15 |
| 13A | 240 | 120 | 32 | 160 | 28 | 104 | 4 | 16* | 8 | 8-14 |
| 13B | 480 | 240 | 16 | 320 | 56 | 224 | 8 | 16* | 16 | 8-14 |
| 14 | 480 | 240 | 16 | 320 | 56 | 232 | 8 | 8* | 16 | 15 |
| 14A | 480 | 240 | 16 | 320 | 56 | 224 | 8 | 16* | 16 | 8-14 |
| 14B | 960 | 480 | 8 | 640 | 112 | 464 | 16 | 16* | 32 | 8-14 |
| 15 | 960 | 480 | 8 | 640 | 120 | 488 | 8 | 8* | 16 | 15 |
| 15A | 960 | 480 | 8 | 640 | 120 | 480 | 8 | 16* | 16 | 8-14 |
| 15B | 1920 | 960 | 4 | 1280 | 240 | 976 | 16 | 16* | 32 | 8-14 |
| 16 | 1920 | 960 | 4 | 1280 | 248 | 1000 | 8 | 8* | 16 | 15 |
| 16A | 1920 | 960 | 4 | 1280 | 248 | 992 | 8 | 16* | 16 | 8-14 |

| SYMBOL | | |
|---|---|---|
| | 1 | 2 |
| I | 1 | 1 |
| Q | 1 | 1 |

FIG. 12

Table 8.27: Parameters for TPC command combining

| Parameter | Unit | Test 1 | Test 2 |
|---|---|---|---|
| Phase reference | - | P-CPICH | |
| DPCH_Ec/Ior | dB | -12 | |
| $\hat{I}_{or1}$ and $\hat{I}_{or2}$ | dBm/3.84 MHz | -60 | |
| $I_{oc}$ | dBm/3.84 MHz | - | -60 |
| Power-Control-Algorithm | - | Algorithm 1 | |
| Cell 1 TPC commands over 4 slots | - | {0,0,1,1} | |
| Cell 2 TPC commands over 4 slots | - | {0,1,0,1} | |
| Information data Rate | kbps | 12.2 | |
| Propagation condition | - | Static without AWGN source $I_{oc}$ | Multi-path fading case 3 |

FIG. 13(a)

Table 8.28: Test requirements for Test 1

| Test Number | Required power changes over the 4 consecutive slots |
|---|---|
| 1 | Down, Down, Down, Up |

FIG. 13(b)

Table 8.28A: Requirements for Test 2

| Test Number | Ratio (Transmitted power UP) / (Total number of slots) | Ratio (Transmitted power DOWN) / (Total number of slots) |
|---|---|---|
| 2 | ≥0.25 | ≥0.5 |

FIG. 16

| Radio Link | TPC Transmitted By Base Station | TPC Received By Mobile Station | Transmission Power Control At Mobile Station |
|---|---|---|---|
| Base Station 200-1 | Up | Up | Down |
| Base Station 200-2 | Up | Up | |
| Base Station 200-3 | Up | Down | |

MOBILE STATION APPARATUS AND TRANSMISSION POWER CONTROL METHOD FOR THE SAME APPARATUS

CROSS REFERENCE TO RELATED APPLICATION(S)

This application is based on and hereby claims priority to Japanese Application No. 2006-39790 filed on Feb. 16, 2006 in Japan, the contents of which are hereby incorporated by reference.

BACKGROUND OF THE INVENTION

1) Field of the Invention

The present invention relates to a mobile station apparatus and a transmission power control method for the same apparatus and, for example, it relates to a technique suitable for use in a system employing an HSDPA (High Speed Downlink Packet Access) transmission mode which is one of transmission modes for mobile communication systems.

2) Description of the Related Art

In 3GPP (3rd Generation Partnership Project), there has been standardized a W-CDMA (Wideband-Code Division Multiple Access) mode which is one mode of the third generation mobile communication system. In addition, the HSDPA which provides a transmission rate of a maximum of approximately 14 Mbps in a downlink is provided as one subject matter of the standardization.

The HSDPA employs an adaptive coding modulation mode and is characterized by making the switching between, for example, the QPSK modulation mode and the 16-value QAM mode according to a radio environment between a base station and a mobile station apparatus (which will hereinafter be referred to equally as a "mobile station or mobile unit").

As the main radio channels to be used in the HSDPA, there are HS-SCCH (High Speed-Shared Control Channel), HS-PDSCH (High Speed-Physical Downlink Shared Channel) and HS-DPCCH (High Speed-Dedicated Physical Control Channel).

Each of the HS-SCCH and the HS-PDSCH is a common channel in a down direction (i.e., a direction from a base station to a mobile station, and the HS-SCCH is a control channel for transmitting various types of parameters related to data to be transmitted through the HS-PDSCH. Among the various types of parameters, for example, there are modulation type information indicative of which of modulation modes is used for transmitting data through the HS-PDSCH and information such as the number of spread codes to be allocated (the number of codes) and a pattern of rate matching to be conducted with respect to transmission data.

On the other hand, the HS-DPCCH is an individual control channel in an up direction which is an direction from a mobile station to a base station, and this HS-DPCCH is used in a case in which a mobile station transmits an ACK signal and an NACK signal to a base station according to the propriety of reception of data received through the HS-PDSCH. In a case in which the mobile station fails to receive the data, for example, when the received data shows a CRC (Cyclic Redundancy Check) error, the NACK signal is transmitted from the mobile station, and the base station carries out re-transmission control.

In addition, the HS-DPCCH is also used in a case in which a mobile station, which has measured a reception quality (for example, SIR: Signal to Interference Ratio) of a received signal from a base station, transmits a result of the measurement as a CQI (Channel Quality Indicator) to the base station.

On the basis of the received CQI, the base station makes a decision on the quality of radio environment in a down direction and, if the quality is high, makes the switching to a modulation mode which can transmit data at a higher speed and, if the quality is low, makes the switching to a modulation mode for transmitting data at a lower speed (that is, adaptive modulation).

"Channel Structure"

Secondly, a description will be given hereinbelow of a channel structure.

FIG. 7 is an illustration of a channel structure in the HSDPA. The W-CDMA employs the code division multiplex, and each channel is separated by a code.

First of all, a brief description will be given hereinbelow of channels which are not mentioned yet.

Each of CPICH (Common Pilot Channel) and SCH (Synchronization Channel) is a common channel in a down direction.

The CPICH is a channel to be utilized for channel estimation in a mobile station and cell search, and as a timing reference for the other down-direction physical channels in the same cell, so-called a channel for the transmission of a pilot signal. The SCH is exactly classified into P-SCH (Primary SCH) and S-SCH (Secondary SCH), and is a channel for a burst-like transmission with 256-chip at the head of each slot. The SCH is received by a mobile station made to carry out three-stage cell search, and is used for establishing slot synchronization and frame synchronization.

Likewise, with reference to FIG. 7, a description will be given hereinbelow of the relationship between timings of a channel.

As shown in FIG. 7, in each channel, 15 slots (each slot corresponds to a 256-chip length) constitute one frame. Since the CPICH is used as a reference for other channels as mentioned above, the head of a frame of each of the SCH and the HS-SCCH coincides with the head of a frame of the CPICH.

In this case, although the head of the frame of the HS-PDSCH is delayed by two slots with respect to the HS-SCCH and others, this is for, after a mobile station receives modulation method information through the HS-SCCH, enabling the demodulation of the HS-PDSCH according to a demodulation method corresponding to the received modulation method. Moreover, in the HS-SCCH and the HS-PDSCH, three slots constitute one subframe.

The HS-PDSCH is a channel in an up direction, and the first slot thereof is used for the transmission of an ACK/NACK signal indicative of a result of reception of the HS-PDSCH from a mobile station to a base station after the elapse of approximately 7.5 slots from the reception of the HS-PDSCH. Moreover, the second and third slots thereof are used for the periodic feedback transmission of CQI information for adaptive modulation control to a base station. In this case, the CQI information to be transmitted is calculated on the basis of a reception environment (for example, a result of SIR measurement of CPICH) measured for a period of time between the last-but-three slots and the last slot with respect to the CQI transmission.

The ACK or NACK signal for the notification of the propriety of reception of the HS-PDSCH can also be issued repeatedly two or more times according to setting.

That is, a mobile station, which has received a notification on an announcement of transmission of the HS-PDSCH through the first subframe A of the HS-SCCH, demodulates and decodes the HS-PDSCH (first subframe E) delayed by two slots to carry out a CRC check for detecting the presence or absence of an error.

If the decision shows no error, an ACK signal (slot C in FIG. 7) is transmitted through the use of the first slot of the subframe delayed by approximately 7.5 slots from the reception of the HS-PDSCH and the same ACK signal (slot D in FIG. 7) is further transmitted repeatedly through the use of the first slot after one subframe. Naturally, in the case of the detection of an error, the NACK signal is repeatedly transmitted.

In this case, although it is also possible to inhibit the repeated transmission of the reception result, when the same ACK signal or NACK signal is repeated transmitted N times (N represents a natural number), the ACK signal or NACK signal is more reliably received by a base station, thereby avoiding the useless re-transmission control.

However, since the ACK signal or NACK signal is repeatedly transmitted by the next subframe, it is inhibited to transmit the HS-PDSCH to the same mobile station by the succeeding N subframes including the next subframe.

This is for preventing the occurrence of no discrimination between the ACK signal (slot D in FIG. 7) related to the repeated transmission of the reception result (ACK signal, NACK signal) on the first subframe E of the HS-PDSCH corresponding to the first subframe A of the HS-SCCH and the ACK signal related to the first transmission of the reception result (ACK signal, NACK signal) on the second subframe F of the HS-PDSCH corresponding to the second subframe B of the HS-SCCH.

Furthermore, a communication system using an HSDPA transmission method has a transmit power control (TPC) function to solve the so-called "far and near problem" by controlling the transmission power between a base station and a mobile station.

The "far and near problem" signifies the following phenomenon.

In general, with respect to a radio electric wave, the attenuation quantity increases as the transmission distance becomes longer. For example, in the case of a communication system based on the CDMA mode, since the frequency bands to be used by a plurality of mobile stations (users) exist mixedly in the same frequency band, in a case in which the transmission power of a signal transmitted by a mobile station close to a base station is high, the transmitted signals from the other mobile stations positioned at a greater distance with respect to the aforesaid mobile station suffer the interference with the transmitted signal from the mobile station close thereto, which affects the transmission/reception between the mobile stations and the base station.

For this reason, for preventing the "far and near problem", for example, a communication system based on the CDMA mode always monitors the communication quality and uses TPC command bits (sometimes, which will hereinafter be referred to simply as a "TPC command" or "TPC bit"), thus carrying out the TPC for, if the communication quality is low, increasing the transmission power of a faraway mobile station and, if the communication quality reaches a sufficient level and the transmission power is excessive, decreasing the transmission power of the mobile station.

FIG. 8 shows a frame format for the TPC bits. In FIG. 8, the TPC bits in a down direction (downlink, i.e., direction from a base station to a mobile station), together with TFCI (Transport Format Combination Indicator) bits for displaying a format of a transport channel, are mapped in a control channel (DPCCH: Dedicated Physical Control Channel) of a DPCH (Dedicated Physical Channel) which forms an individual physical channel in the downlink, and are time-multiplexed with a DPDCH (Dedicated Physical Data Channel), forming a data channel, within a slot having 2560-chip time per slot. Accordingly, 1 slot=2560 chip time becomes a cycle of a high-speed TPC.

In addition, one frame is composed of 15 slots (slots #0 to #14), and this frame is continuously transmitted to a mobile station on a cycle of 10 ms.

FIG. 9 shows values to be taken by the DPDCH and the DPCCH. As shown in FIG. 9, 49 formats are provided with respect to one slot, and each defines a channel bit rate, a channel symbol rate and others, while one of four numbers, i.e., 2, 4, 8 and 16, is taken with respect to the number of TPC bits ($N_{TPC}$).

Furthermore, FIG. 10 is an illustration of a conventional configuration for the TPC processing in a base station and a mobile station. In FIG. 10, 200-1 and 200-2 represent base stations (Node-B#1, Node-B#2), and 201 designates a mobile station (UE: User Equipment). In this illustration, although the base stations are two in number, naturally, the configuration also applies to a case in which three or more base stations exist. In the case of no discrimination between the base stations 200-1 and 200-2, the base stations are designated simply at 200.

Each of the base stations 200-1 and 200-2 shown in FIG. 10 is made up of, when taking note of an essential part thereof, a matched filter 202, a RAKE combiner 203, an SIR measuring unit (SIR measurement after side diversity) 204, a channel decoder 205, a block error rate (BLER) measuring unit (BLER measurement) 206, adders 207 and 209, a target BLER memory 208, a target BLER calculating unit (Target SIR) 210 and a TPC command generator 211.

In the base station 200-1 (200-2) thus configured, an up-direction (uplink, i.e., direction from a mobile station to a base station) signal transmitted from the mobile station 201 is inputted through a reception antenna (not shown) to the matched filter 202 and, after subjected to the inverse spread processing in this matched filter 202, it is inputted to the RAKE combiner 203 and the SIR measuring unit 204.

The RAKE combiner 203 conducts the RAKE combination processing on the inputted signal, and the channel decoder 205 conducts the channel decoding processing on the combined signal. Moreover, the BLER measuring unit 206 measures of the BLER of the received signal on the basis of the decoded data, and the adder 207 detects a difference between the measured BLER and a target BLER stored in the target BLER memory 208, and the target BLER calculating unit 210 calculates a target SIR on the basis of the detected difference.

Meanwhile, the SIR measuring unit 204 measures an SIR on the basis of an inputted signal from the matched filter 202, and the adder 209 detects a difference between the measurement result and the target SIR obtained by the target SIR measuring unit 210. Moreover, the TPC command generator 211 generates a TPC command on the basis of the detection result, with the generated TPC command being transmitted to the mobile station 201 through the DPCCH of the DPCH in the downlink as mentioned above.

On the other hand, the mobile station 201 shown in FIG. 10 is, for example, made up of, when taking note of an essential part thereof, TPC processing units 201-1 and 201-2 corresponding to the base stations 200-1 and 200-2, an adder 221, a channel decoder 222 and a TPC command combiner 225. Each of the TPC processing units 201-1 and 201-2 is composed of a matched filter 212 for DPCH, a matched filter 213 for CPICH, channel estimating units (channel estimation) 214 and 215 for each reception antenna (Antenna 1, Antenna 2) (not shown), multipliers 216 and 217, RAKE combiners 218 and 219, an adder 220, a TPC symbol soft decision unit (TPC symbol Soft decision) 223 and a TPC command decision (hard decision) unit (TPC Command Decision (Hard Decision)) 224.

In the mobile station 201 having this configuration, signals transmitted from a plurality of base stations 200-1 and 200-2 are inputted through reception antennas (not shown) to the matched filters 212 and 213 and subjected to the inverse spread processing using channelization code of the DPCH or the CPICH so that a DPCH/CPICH signal is separated and extracted, with the received signal of the DPCH being inputted to the channel estimating units 214, 215 and the multipliers 216, 217.

In addition, each of the channel estimating units 214 and 215 carries out a required correlative operation on a received signal of the DPCH inputted from the matched filter 212 on the basis of a received signal (pilot signal) of the CPICH inputted from the matched filter 213 so as to obtain an channel estimate for each antenna (Antenna 1, Antenna 2) with respect to the base station 200-1, 200-2, and each of the multipliers 216 and 217 multiplies this channel estimate by the received signal of the DPCH obtained by the DPCH matched filter 212 for carrying out the channel compensation processing.

The received signals after the channel compensation are further inputted to the RAKE combiners 218 and 219 to be subjected to the RAKE combination processing and are added (combined) in the adder 220 and, subsequently, in the adder 221, further added (combined) to the signal (i.e., received signal from the other base station) obtained in like manner by the other TPC processing unit 201-2 and then channel-decoded in the channel decoder 222, thereby providing received data.

Still additionally, the combined signal obtained by the adder 220 is inputted to the TPC symbol soft decision unit 223 and, after subjected to the soft decision processing in the TPC symbol soft decision unit 223, it undergoes the hard decision processing in the TPC command decision unit 224.

In this case, as the TPC bits to be mapped in the DPCCH, a plurality of bits (one number of 2, 4, 8 and 16) are taken according to a slot format (see FIG. 9) and, hence, in the TPC symbol soft decision unit 223, a slot format decision is made (step S200 in FIG. 14), and a soft decision combination is made with respect to a plurality of TPC symbols (steps S201 and S202 in FIG. 14), and a TPC command from each radio link (RL) (base station 200-1, 200-2), obtained in this way, is subjected to the hard decision combination in TPC command decision unit 224 (step S203 in FIG. 14).

In consequence, if it is larger than 0, the TPC command decision unit 224 determines 1 (increases the transmission power (UP)) and, if smaller than 0, the TPC command decision unit 224 determines 0 (decreases the transmission power (DOWN)) (steps S203 and S204 in FIG. 14).

The TPC commands from the respective RLs, detected by the TPC processing units 201-1 and 201-2 as mentioned above, are combined in the TPC command combiner 225 and, in a case in which all the TPC commands received from all the RLs (RL#i (i=1 to n) in FIG. 14) stand at 1 (increasing the transmission power), the control for increasing the transmission power is executed (outputting 1) while, in other cases (if at least one of the TPC commands received from all the RLs stands at 0), the (DOWN) control for decreasing the transmission power is executed (outputting 0) (steps S205 and S206 in FIG. 14).

Soft Decision Combination and Hard Decision Combination

As mentioned above, the TPC bits are mapped in the DPCCH and stand at one of 2 bits, 4 bits, 8 bits and 16 bits according to a slot format. When the transmission is made by wireless, since the DPCCH is I- and Q-mapped, the following description will be given of, for example, a case in which the TPC bits are 4 bits in the QPSK.

In a case in which the base station 200 transmits the TPC bits (4 bits) "1111 (UP)", since 2-bits transmission is made with 1-symbol in the QPSK, the data of (1, 1) is transmitted with 2-symbol (I, Q) as shown in FIG. 11(a).

In the case of the soft decision combination, instead of a decision based upon only 0/1, the TPC bits are decided in an analog fashion.

For example, let it be assumed that 1-symbol I, Q and 2-symbol I, Q are (0.5, 0.8, −0.3, 0.5).

At this time, the reception side I-Q constellation becomes as shown in FIG. 11(b). The soft decision combination is made by decomposing it into the I component and the Q component and obtaining the sum total of the respective bits.

In the case of the soft decision combination of the 4 bits, the sum total of the respective bits is obtained by the following equation (1).

$$0.5+0.8-0.3+0.5=1.5 \tag{1}$$

Since the sum total thus obtained exceeds 0 (in this case, 1.5), the TPC command (TPC_cmd) is set at 1, and a decision is made that it is a power increasing (UP) request.

On the other hand, in the case of the hard decision combination, since a decision is made on the basis of higher or lower values than the zero references of the I and Q components, the aforesaid TPC bits become (1, 1, 0, 1).

That is, in the case of the hard decision combination, the decision on a signal is made on the basis of only 1 or 0 while in the case of the soft decision combination, the decision is made on the basis of not only 0/1 but also information indicative of the degree of reliability.

In a conventional TPC processing mode, as mentioned above, the soft decision combination on the TPC bits is made within one RL and the hard decision combination is made on a result of the soft decision combination, thus determining which of UP/DOWN this RL notifies. Moreover, for the combination among a plurality of RLs, on the basis of the TPC commands from the respective RLs, if at least one RL indicates DOWN, the mobile station 201 operates so as to decrease the transmission power.

The non-patent document 1, mentioned later, discloses an algorithm related to a combination method for TPC commands transmitted from a plurality of base stations.

$$\text{TPC\_cmd}=(W_1, W_2, \ldots W_N) \text{ where TPC\_cmd can take the values 1 or } -1 \tag{2}$$

According to this algorithm, the TPC commands from the plurality of base stations 200 are processed on the same condition (no weighting) and are decided equally. Moreover, according to the non-patent document 2, mentioned later, as shown in FIG. 12, the test condition is prescribed and a rule exists with respect to the accuracy at the TPC command combination of different RLs (between the base station 200 and a cell).

On the basis of these specifications, when the TPC commands received from all the RLs stand at 1 (increasing the transmission power), the mobile station 201 executes the control for increasing the transmission power and, in other cases (if at least one of the TPC commands received from all the RLs stands at 0), carries out the control for decreasing the transmission power. In other words, the control is executed so as to reduce the transmission power in a case in which there is a difference among the TPC commands received from a plurality of RLs.

That is, each of $W_1, W_2, \ldots W_N$ (N represents a natural number) in the aforesaid equation (2) signifies a result of the soft decision combination of the TPC commands from the RLs corresponding to 1 to N and, when the TPC command (TPC_cmd) indicates 0 or 1 with no correlation, with respect to TPC_cmd from all the RLs, the value of the function γ is set at 1 in a case in which the rate of TPC_cmd standing at 1 exceeds $\frac{1}{2}^N$ while it is set at 0 in a case in which the rate of TPC_cmd standing at 0 exceeds 0.5 (½). Moreover, as a rule, TPC_cmd becomes 1 (enhancement of power) when all the TPC commands from a plurality of RLs stand at 1 (increasing the transmission power) and it becomes −1 (reduction of power) when at lest one of the TPC commands from the RLs stands at 0 (decreasing the transmission power).

For example, as shown in FIG. 13(a), in "Test 1" (test case 1) in FIG. 12, under a static environment which does not have interference or fading, the TPC command from a cell 1 shows (0, 0, 1, 1) and the TPC command from a cell 2 shows (0, 1, 0, 1) and, hence, the control for an increase of power is executed only when both the TPC commands stand at 1 and the control for a decrease of power is executed in other cases.

Moreover, as shown in FIG. 13(b), in "Test 2" (test case 2) in FIG. 12, under a multipass fading environment, a rule is set with respect to the TPC commands from all the RLs so that the power is increased when the rate that the TPC command indicates 1 exceeds 0.25 (25%) while the power is decreased when the rate that the TPC command indicates 0 exceeds 0.5 (50%).

The patent document 1, mentioned later, discloses that, at the occurrence of a re-transmission request from a mobile station, a signal on the re-transmission request is transmitted through a radio channel whereby the transmission power from a base station reaches a predetermined value while satisfying a necessary reception quality in that mobile station and, hence, when the transmission power from the base station is set at the aforesaid predetermined value, the transmission power from the base station is suppressible to a minimum, thereby reducing the interference with the other mobile stations which do not receive the signal on the aforesaid re-transmission request.

In addition, the patent document 2, mentioned later, discloses that increasing and decreasing quantities of transmission power levels in a mobile station and in a base station are determined on the basis of the weighting coupling of a plurality of factors (at least three of route, number of base stations, position, power control command and ON/OFF of interference cancellation) representative of the present channel situation or the value of the previous power control command.

Still additionally, the patent document 3, mentioned later, discloses that, when a directional antenna is applied to an AAA (Adaptive Array Antenna) system, a transmitting/receiving mobile station is selected so that the directional beams addressed to the respective mobile stations do not interfere with each other and, for the purpose of allocating a radio resource to the selected mobile station, the SIR or the like is utilized with respect to the quality information received by the mobile station for determining the directional beam.

[Patent Document 1] Japanese Patent Laid-Open No. 2003-78480

[Patent Document 2] Published Japanese translation of a PCT Application, No. 2002-537712

[Patent Document 3] Japanese Patent Laid-Open No. 2003-235072

[Non-Patent Document 1] 3rd Generation Partnership Project; Technical Specification Group Radio Access Network; Physical layer procedures (FDD) (Release 6) (3GPP TS25.214 V6.7.1 (2005-12))

[Non-Patent Document 2] 3rd Generation Partnership Project; Technical Specification Group Radio Access Network; User Equipment (UE) radio transmission and reception (FDD) (Release 7) (3GPP TS 25.101 V7.2.0 (2005-12))

According to the above-described conventional techniques, although all the TPC commands from a plurality of base stations are compared equally under the same condition and one TPC result is derived finally, the TPC command obtained from a far away base station has a high error rate in the process thereof and, hence, a reception result in a mobile station can be recognized in error. That is, a mistaken recognition on the power control information from a faraway base station can occur (the transmission power UP is recognized in error as the transmission power DOWN, or vice versa).

FIG. 15 is an illustrative view showing one example of the relationship in position between a mobile station and a base station. In FIG. 15, for example, the base stations 200 are three (200-1, 200-2 and 200-3) in number, and FIG. 16 shows the relationship among TPC commands transmitted from these base stations 200-1 to 200-3, TPC commands received on the mobile station 201 side and transmission power control in this case. The following description will be given of an example of a case in which the distance between the base station 200-3 and the mobile station 201 is longer than the distance between the other base station 200-1 or 200-2 and the mobile station 201 and the reception power of the TPC command from the base station 200-3 falls into a dropped condition.

At this time, although the original TPC commands to be transmitted from the base stations 200-1, 200-2 and 200-3 are in the UP state (increasing the transmission power), since the distance between the base station 200-3 and the mobile station 201 is long, a misjudgment on the TPC command from the base station 200-3 occurs in the mobile station 201 due to bit error (the TPC command from the base station 200-3 is recognized as DOWN), thereby leading to the transmission power control (DOWN) different from the transmission power control (UP) expected originally.

Thus, in a case in which a TPC command from a faraway base station, which has a reliability generally lower than that of the other base station, is handled in the same way (without weighting) as a TPC command from the other base station having a reliability higher than that of the aforesaid faraway base station, there is a possibility of power control in error for the above-mentioned reasons. That is, due to the above-mentioned mistaken judgment, the interference with the other cells can occur when the transmission power form a mobile station increases excessively. Moreover, when the transmission power from a mobile station further decreases than needed, difficulty is experienced in transmitting an up signal to a base station (which is referred to as "out of up synchronization").

Therefore, as mentioned above, from the viewpoint of radio network, when the transmission power in a mobile station is controlled to a minimum in a range allowing the reception by a base station and satisfying a desired error rate (Target BLER), it is possible to suppress the wasteful use and contribute to an increase in number of users to be multiplexed.

SUMMARY OF THE INVENTION

The present invention has been developed in consideration of the above-mentioned problems, and it is therefore an object of the invention to improve the judgment accuracy in a mobile station with respect to a TPC command (power control information) from a base station to the mobile station and maintain the optimum transmission power.

For this purpose, the present invention is characterized by using the following mobile station apparatus and transmission power control method.

(1) In accordance with the present invention, there is provided a mobile station apparatus, which controls transmission power based on power control information received from a plurality of base station apparatuses, comprising weighting combination means for making a weighting combination among the plurality of power control information received from the plurality of base station apparatus and transmission power control means for controlling transmission power based on a result of the weighting combination by the weighting combination means.

(2) In this case, it is also appropriate that the weighting combination means includes a first weight processing unit for setting a weighting factor (weight ratio or weighting coefficient) for the power control information from at least one of the plurality of base station apparatuses at a higher value than a weighting factor for the power control information from one or more of the other base station apparatuses.

(3) In addition, it is also appropriate that the mobile station apparatus further includes reception quality measuring means for measuring a quality of reception from each of the plurality of base station apparatuses and the weighting combination means includes a second weight processing unit for, according to results of the reception quality measurement by the reception quality measuring means, setting a weighting factor for the power control information from a first base station providing a high reception quality at a higher value than a weighting factor for a second base station apparatus providing a low reception quality.

(4) Still additionally, it is also appropriate that the mobile station apparatus further includes reception quality measuring means for measuring a quality of reception from each of the plurality of base station apparatuses, and the weighting combination means includes a first weight processing unit for setting a weighting factor for the power control information from at least one of the plurality of base station apparatuses at a higher value than a weighting factor for the power control information from one or more of the other base station apparatus, a second weight processing unit for, according to results of the reception quality measurement by the reception quality measuring means, setting a weighting factor for the power control information from a first base station providing a high reception quality at a higher value than a weighting factor for a second base station apparatus providing a low reception quality and a selection unit for selecting one of the first weight processing unit and the second weight processing unit, which is to be put into operation, based on the number of base stations providing a reception quality, measured by the reception quality measuring means, exceeding a predetermined threshold.

(5) In this case, it is also appropriate that the selection unit selects the first weight processing unit when the base station exceeding the threshold is one in number and selects the second weight processing unit when the base stations exceeding the threshold are two or more in number.

(6) Furthermore, in accordance with the present invention, there is provided a transmission power control method of, in a mobile station apparatuses, controlling transmission power based on power control information received from a plurality of base station apparatuses, wherein the plurality of power control information received from the plurality of base station apparatuses are weighting-combined so as to control the transmission power based on a result of the weighting-combination.

(7) In this case, it is also appropriate that the mobile station apparatus sets a weighting factor for the power control information from at least one of the plurality of base station apparatuses at a higher value than a weighting factor for the power control information from one or more of the other base station apparatuses (100-1, 100-2).

(8) In addition, it is also appropriate that a quality of reception from each of the plurality of base station apparatuses is measured so as to set a weighting factor for the power control information from the base station providing a high measured reception quality at a higher value than a weighting factor for the base station apparatus providing a low measured reception quality.

(9) Still additionally, it is also appropriate that a quality of reception from each of the plurality of base station apparatuses is measured so as to, on the basis of the number of base stations each providing a reception quality exceeding a predetermined threshold, make a selection between a first weight processing mode of setting a weighting factor for the power control information from at least one of the plurality of base station apparatuses at a higher value than a weighting factor for the power control information from one or more of the other base station apparatuses and a second weight processing mode of, according to results of the reception quality measurement, setting a weighting factor for the power control information from the base station providing a high reception quality at a higher value than a weighting factor for the base station apparatus providing a low reception quality.

(10) In this case, it is also appropriate that the first weight processing mode is selected when the base station exceeding the threshold is one in number and the second weight processing mode is selected when the base stations exceeding the threshold are two or more in number.

The above-described present invention can provide at least one of the following effects/advantages.

(1) Since a plurality of power control information transmitted from a plurality of base station apparatuses are combined with respect to weighting to control the transmission power based on the a result of the combination thereof, even in a power control information misrecognition possible environment, the decision accuracy on the power control information is improvable to achieve the intended transmission power control.

(2) At the weighting combination, a weighting factor for the power control information from one (for example, main communication partner) of a plurality of base station apparatuses is set to be higher than the weighting factor for the power control information from one or more of the other base station apparatuses, which can suppress the mistaken transmission power control more reliably.

(3) In addition, with respect to signals transmitted from a plurality of base station apparatuses, a weighting factor for the power control information from the base station apparatus providing a high reception quality is set at a higher value than a weighting factor for the base station apparatus providing a low reception quality, which enables the transmission power control to be executed based on the power control information from a high-reliability base station apparatus according to the results of actual measurement of reception quality, thereby further reducing the mistaken transmission power control.

(4) Still additionally, the above-mentioned weight processing (2) or (3) is selected according to the number of base station apparatus each providing a reception quality exceeding a predetermined threshold, which enables a selection of appropriate weight processing according to a situation (radio environment) such as a case in which a large number of base station apparatuses each having a high reliability exist (for example, the base station apparatuses each exceeding the aforesaid threshold are two or more in number) or a case in which a small number of base station apparatuses each having a high reliability exist (for example, the base station apparatus exceeding the aforesaid threshold is one in number), thereby suppressing the mistaken transmission power control more reliably.

(5) Yet additionally, by combining the respective weighting factors in the foregoing (2) and (3), it is possible to equalize the transmission power control, for example, in the excessive state of handover when a mobile station is in movement.

(6) Moreover, when the control on the availability or unavailability of the weighting combination is executed according to a result of measurement of the reception quality, if there is no need to carry out the weighting combination (for example, in a case in which the reception qualities of all the base station apparatuses exceed a threshold), it is possible to invalidate the weighting combination, which can realize appropriate transmission power control according to the positional relationship (relationship in reception quality) between a mobile station apparatus and a base station apparatus while reducing the weighting combination processing load.

BRIEF DESCRIPTION OF THE DRAWINGS

FIG. 3 is an illustration of one example of a weighting factor generation pattern (MODE) according to this embodiment;

FIG. 7 is an illustration of a channel structure in HSDPA;

FIG. 9 is an illustration of values of DPDCH and DPCCH;

FIG. 12 is an illustration of parameters in a TPC command test environment in HSDPA;

FIG. 13(a) is an illustration of a transmission power control regulation in a test case 1 shown in FIG. 12;

FIG. 13(b) is an illustration of a transmission power control regulation in a test case 2 shown in FIG. 12;

FIG. 16 is an illustration for explaining transmission power control in a case in which a mistaken recognition of a TPC command occurs on a mobile station side.

DESCRIPTION OF THE PREFERRED EMBODIMENTS

An embodiment of the present invention will be described hereinbelow with reference to the drawings.

[A] Description of Embodiment

Figure 1:
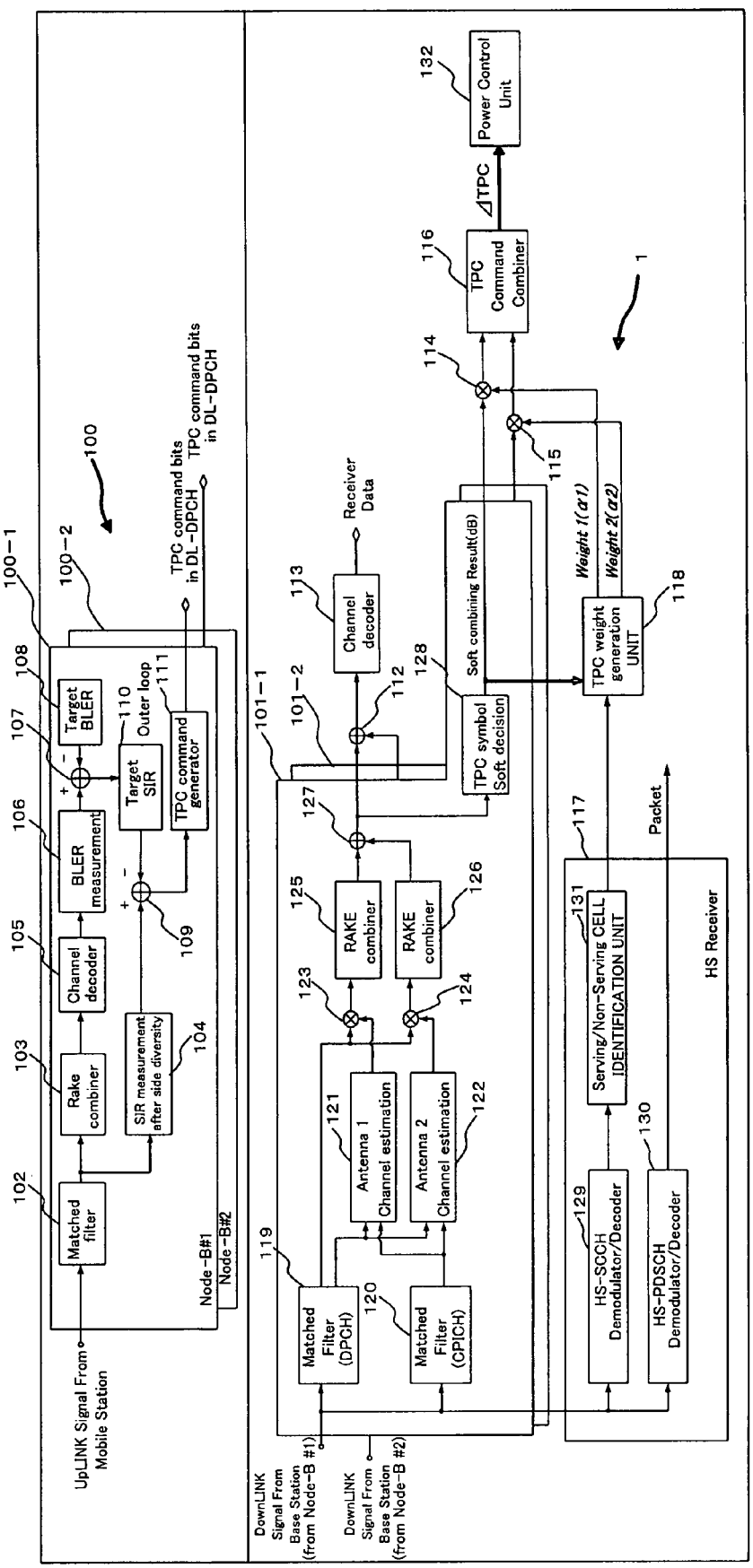
FIG. 1 is a block diagram showing a configuration of a mobile communication system according to an embodiment of the present invention while taking note of configurations of essential parts of a base station apparatus and a mobile station apparatus.

FIG. 1 is a block diagram showing a configuration of a mobile communication system according to an embodiment of the present invention while taking note of configurations of essential parts of a base station apparatus and a mobile station apparatus. In FIG. 1, two base station apparatus 100-1 and 100-2 (Node-B#1, Node-B#2) and one mobile station apparatus (which will hereinafter be referred to simply as a "mobile station") 1 are principally shown, and each of the base station apparatus (each of which will hereinafter be referred to simply as a "base station") 100-1 and 100-2 (in the case of no discrimination therebetween, they will be designated at reference numeral 100) is made up of, for example, a matched filter 102, a RAKE combiner 103, an SIR measuring unit (SIR measurement after side diversity) 104, a channel decoder 105, a block error rate (BLER) measuring unit (BLER measurement) 106, adders 107 and 109, a target BLER memory 108, a target SIR calculating unit 110 and a TPC command generator 111.

In this configuration, in each of the base stations 100, the matched filter 102 is for carrying out the inverse spread processing on an up signal (uplink signal) from the mobile station 1, received through a reception antenna (not shown), the RAKE combiner 103 is for making a RAKE combination on a received signal (multipass signal) after inverse-spread by the matched filter 102, the channel decoder 105 is for decoding (channel-decoding) the signal after this RAKE combination, and the BLER measuring unit 106 is for measuring the BLER of the received signal on the basis of a result of the channel decoding.

The adder (subtractor) 107 is for detecting a difference between the BLER measured by the BLER measuring unit 106 and a target BLER stored in the target BLER memory 108, and the target SIR calculating unit 110 is for calculating a target SIR on the basis of the difference therebetween.

The SIR measuring unit 104 is for measuring the SIR of the received signal after the inverse spread processing by the aforesaid matched filter 102, the adder (subtractor) 109 is for detecting a difference the SIR measured by the SIR measuring unit 104 and the target SIR obtained by the aforesaid target SIR calculating unit 110, and the TPC command generator 111 is for generating a TPC command (power control information) on the basis of the difference therebetween.

In the base station 100-1 (100-2) thus configured, an up-direction (uplink, i.e., direction from a mobile station to a base station) signal transmitted from the mobile station 1 is inputted through a reception antenna (not shown) to the matched filter 102 and, after subjected to the inverse spread processing by the matched filter 102, it is inputted to the RAKE combiner 103 and the SIR measuring unit 104.

The RAKE combiner 103 carries out the RAKE combination processing on the inputted signal, and the channel decoder 105 conducts the channel decoding processing on the combination-processed signal. In addition, the BLER measuring unit 106 measures the BLER of the received signal on the basis of the decoded data, and the adder 107 detects a difference between the measured BLER and the target BLER stored in the target BLER memory 108, and the target SIR calculating unit 110 calculates a target SIR on the basis of the difference therebetween.

On the other hand, the SIR measuring unit 104 measures an SIR on the basis of the inputted signal from the matched filter 102, and the adder 109 detects a difference between the measurement result and the target SIR obtained by the target SIR calculating unit 110. Moreover, the TPC command generator 111 generates a TPC command on the basis of the detection result, with this TPC command being transmitted to the mobile station 1 through the DPCCH of the DPCH in the downlink as mentioned above.

Meanwhile, as shown in FIG. 1, the mobile station 1 is made up of, for example, TPC processing units 101-1 and 101-2 corresponding to the base stations 100-1 and 100-2, an adder 112, a channel decoder 113, multipliers 114 and 115, a TPC command combiner 116, an HS channel reception processing unit (HS Receiver) 117, a TPC weighting factor generating unit (TPC weight generation UNIT) 118 and a transmission power control unit (Power Control Unit) 132. In FIG. 1, although, for convenience of explanation only, the base stations are two in number and the TPC processing units are also two in number, it is also possible to use three or more base stations and three or more TPC processing units.

Furthermore, each of the TPC processing units 101-1 and 101-2 is composed of a matched filter 119 for DPCH, a matched filter 120 for CPICH, channel estimating units (Channel estimation) 121 and 122 each for each reception antenna (Antenna 1, Antenna 2) (not shown), multipliers 123 and 124, RAKE combiners 125, 126, an adder 127 and a TPC symbol soft decision unit 128.

Still furthermore, the HS channel reception processing unit 117 is composed of an HS-SCCH demodulating/decoding unit (HS-SCCH Demodulator/Decoder) 129, an HS-PDSCH demodulating/decoding unit (HS-PDSCH Demodulator/Decoder) 130 and a serving cell identifying unit (Serving/Non-Serving CELL IDENTIFICATION UNIT) 131.

In each of the TPC processing units 101-1 and 101-2, the DPCH matched filter 119 is made to separate/extract a DPCH signal by carrying out the inverse spread processing on down signals (downlink signals) received from the plurality of base stations 100 through the reception antenna (not shown) by use of a DPCH channelization code, and the CPICH matched filter 120 is made to separate/extract a CPICH signal (i.e., pilot signal) by carrying out the inverse spread processing on signals received from the plurality of base stations 100 through the reception antenna by use of a CPICH channelization code, with the DPCH received signal being inputted to the channel estimating units 121, 122 and the multipliers 123, 124 and the CPICH received signal (pilot signal) being inputted to the channel estimating units 121 and 122.

Each of the channel estimating units 121 and 122 is made to carry out a required correlative operation on the DPCH received signal inputted from the DPCH matched filter 119 on the basis of the CPICH received signal (pilot signal) inputted from the CPICH matched filter 120, thereby obtaining a channel estimate for each antenna (Antenna 1, Antenna 2) with respect to the base station 100.

Each of the multipliers 123 and 124 is made to conduct the channel compensation processing on the DPCH received signal by combining (multiplying) the channel estimate and the DPCH received signal obtained by the DPCH matched filter 119.

Moreover, each of the RAKE combiners 125 and 126 conducts the RAKE combination processing on the received signal after the channel compensation, and the adder 127 adds (combines) the signals after the RAKE combination processing.

Still moreover, the adder 112 adds (combines) the signals (received signals from the respective base stations 100) obtained by the adders 127 in the respective TPC processing units 101-1 and 101-2, and the channel decoder 113 channel-decodes the signal from the adder 112 so as to obtain the received data.

Yet moreover, the TPC symbol soft decision unit 128 carries out the soft decision combination processing on the combined signal obtained by the adder 127, thereby generating a TPC command.

On the other hand, in the HS channel reception processing unit 117, the HS-SCCH demodulating/decoding unit 129 demodulates and decodes the HS-SCCH of a down signal received through the aforesaid reception antenna, and the HS-PDSCH demodulating/decoding unit 130 demodulates and decodes the HS-PDSCH of a down signal received through the aforesaid reception antenna.

In this connection, the fact that the HS-SCCH and HS-PDSCH signals are received (demodulated and decoded) signifies that the base station 100 which receives these HS-SCCH and HS-PDSCH signals is a main communication partner, in other words, it is, of the respective base stations 100, the base station 100 (which is referred to as a serving cell) having a highest reliability in reception quality. Moreover, the aforesaid HS-SCCH demodulating/decoding unit 129 also has a function to measure the reception quality (SIR value) with respect to a signal from the base station 100, and it can function as a reception quality measuring means.

The serving cell identifying unit 131 makes a decision as to the presence or absence of data demodulated and decoded by the HS-SCCH demodulating/decoding unit 129 for identifying whether or not this base station 100 is a serving cell and, for example, when the decision shows the presence of data from the HS-SCCH demodulating/decoding unit 129, this base station 100 is identified as a serving cell while, when the decision shows the absence of data from the HS-SCCH demodulating/decoding unit 129, this base station 100 is identified as no serving cell.

In addition, the TPC weighting factor generating unit 118 is made to conduct the weighting factor generation processing on the basis of information including a result of the soft decision combination processing by the TPC symbol soft decision unit 128 and a result of the identification by the serving cell identifying unit 131, and the multipliers 114 and 115 are made to combine (multiply) the weighting factors (coefficients) (in FIG. 1, $\alpha 1$ and $\alpha 2$) generated by the TPC weighting factor generating unit 118 and the results of the soft decision combination processing from the TPC symbol soft decision units 128 of the TPC processing units 101-1 and 101-2. The details of the weighting factor generation processing will be described later.

The TPC command combining unit 116 is made to conduct the combination (addition) processing on the weighted TPC commands outputted from the multipliers 114 and 115 and further to, on the basis of this combination result, output a TPC command ($\Delta_{TPC}$) to the transmission power control unit 132. For example, when the obtained combination result is larger than 0, a control signal for increasing the transmission power is supplied to the transmission power control unit 132 of the mobile station 1 and, in other cases (when the combination result is smaller than 0), a control signal for decreasing the transmission power is supplied thereto.

That is, the above-mentioned TPC weighting factor generating unit 118, multipliers 114, 115 and TPC command combining unit 116, in cooperation with each other, function as a weighting combination means to carry out the weighting combination on a plurality of TPC commands received from the plurality of base stations 100.

The transmission power control unit (transmission power control means) 132 is made to execute the transmission power control in the mobile station 1 on the basis of the TPC command ($\Delta_{TPC}$) outputted from the TPC command combining unit 116. For example, the transmission power control unit 132 executes the transmission power increasing control when the TPC command stands at 1 and executes the transmission power decreasing control when the TPC command stands at 0.

Figure 2:
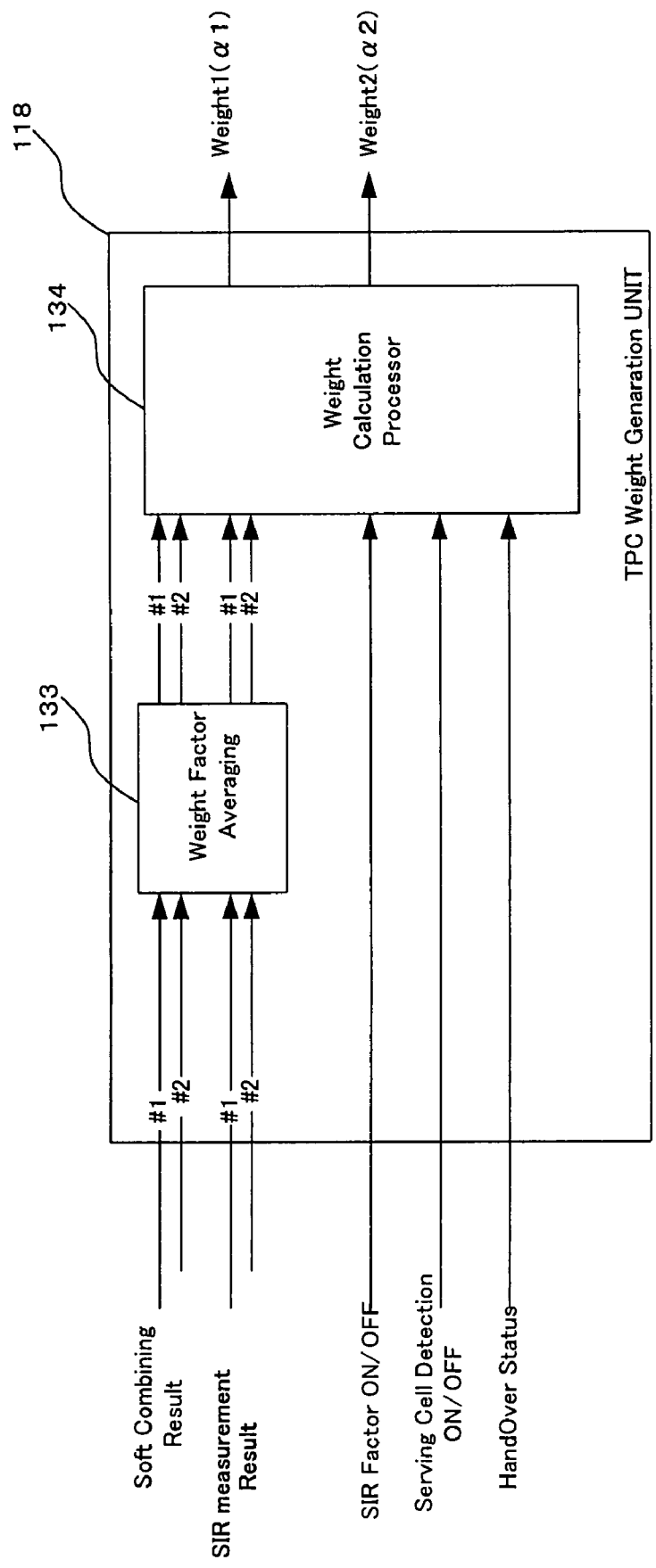
FIG. 2 is a block diagram showing a configuration of a TPC weight factor generating unit shown in FIG. 1.

FIG. 2 shows an internal configuration of the above-mentioned TPC weighting factor generating unit 118, and an operation thereof will be described hereinbelow with reference to FIG. 2.

In FIG. 2, the TPC weighting factor generating unit 118 includes a weighting factor averaging unit (Weight Factor Averaging) 133 and a weighting factor calculation processing unit (Weight Calculation Processor) 134.

In this configuration, the weighting factor averaging unit 133 is made to average each of the result of the soft decision combination processing on a TPC command outputted from the TPC symbol soft decision unit 128 and the result of the SIR measurement (SIR measurement Result) (result of measurement by the aforesaid HS-SCCH demodulating/decoding unit 129) in the downlink with respect to each of the base stations 100 for a predetermined period of time, thereby calculating an average value per unit time.

Moreover, the weighting factor calculation processing unit 134 is made to generate weighting factors (in FIG. 2, Weight 1 ($\alpha 1$), Weight 2 ($\alpha 2$)) on the basis of the soft decision combination processing result averaged by the weighting factor averaging unit 133, the SIR measurement result and various types of setting signals such as a SIR factor ON/OFF setting signal (SIR Factor ON/OFF) from the serving cell identifying unit 131, a serving cell decision ON/OFF setting signal (Serving Cell Detection ON/OFF) and a handover status setting signal (HandOver Status). The aforesaid handover status signal is a control signal representative of occurrence/non-occurrence of handover.

In the TPC weighting factor generating unit 118 thus configured, the averaging by the weighting factor averaging unit 133 can reduce the unnecessary signals such as noises which may be included in the soft decision combination processing result and the SIR measurement result. Moreover, since the weighting factor calculation processing unit 134 produces the weighting factors on the basis of the output if the weighting factor averaging unit 133 and the aforesaid various types of setting signals, it is possible to produce TPC weighting factors suitable for various communication situations.

In this case, for example, as shown in FIG. 3, the aforesaid serving cell decision ON/OFF setting signal is a control signal for setting whether or not the weight processing is conducted on the basis of the fact that the communication partner is a serving cell and, when the serving cell identifying unit 131 identifies a serving cell, it becomes ON (1) while, when the serving cell identifying unit 131 identifies no serving cell, it becomes OFF (0).

That is, the serving cell identifying unit 131 and the weighting factor calculation processing unit 134, in cooperation with each other, realize a function as a first weight processing unit to set the weighting factor for a TPC command from one base state 100 (for example, a serving cell) of the plurality of base stations 100 at a value higher than the weighting factors for TPC commands from the other base stations 100.

In addition, the SIR factor ON/OFF setting signal is a control signal for setting whether or not the weight processing is conducted on the basis of a SIR value. For example, this SIR factor ON/OFF setting signal becomes ON when the SIR value related to a signal from each base station 100, measured by the aforesaid HS-SCCH demodulating/decoding unit 129, is equal to or larger than a threshold previously set in a storage unit (not shown) such as a memory internally included in the aforesaid HS channel reception processing unit 117 and, if it is smaller than the threshold, the SIR factor ON/OFF setting signal becomes OFF.

That is, the aforesaid weighting factor calculation processing unit 134 is made to carry out the weight processing based on the SIR value according to the ON state of the SIR factor ON/OFF setting signal with respect to the plurality of base stations. Accordingly, the weighting factor calculation processing unit 134 also functions as a second weight processing unit to set the weighting factor for the TPC command from the base station 100, which transmits a signal having a high reception quality (SIR value) measured by the HS-SCCH demodulating/decoding unit 129, at a value higher than the weighting factor for the TPC command from the base station 100 which transmits a signal having a low SIR value.

In addition, the weighting factor calculation processing unit 134 further has a counting function to count the ON state of the SIR factor ON/OFF setting signal with respect to the plurality of base stations 100 and, when the count value is equal to or larger than a predetermined value (for example, 2) previously set in a storage unit (not shown) such as a memory built in the HS channel reception processing unit 117, selects the weight processing (operation mode of a second weight processing unit) based on the above-mentioned SIR value for operation. On the other hand, if the count value is smaller than the predetermined value, it can select an operation (operation mode of a first weight processing unit) to set the weighting factor for the TPC command from one base station 100 (for example, serving cell) of the plurality of base stations at a value higher than the weighting factors for the TPC commands from the other base stations 100.

That is, the weighting factor calculation processing unit 134 also has a function as a selection unit to select the weight processing unit (the first weight processing unit or the second weight processing unit), which is to be placed into operation, according to the number of base stations whose SIR value, measured by the HS-SCCH demodulating/decoding unit 129, exceeds a predetermined threshold.

Still additionally, the weighting factor calculation processing unit 134 is designed to set the weighting factor for a TPC command from one base station (for example, serving cell) of the plurality of base stations 100 at a higher value than the weighting factors for TPC commands from the other base stations 100, and further to set the weighting factor for a TPC command from the base station transmitting a signal having a high reception quality (SIR value), measured by the HS-SCCH demodulating/decoding unit 129, at a higher value than the weighting factor for a TPC command from the base station transmitting a signal having a low SIR value.

Therefore, the weighting factor calculation processing unit 134 also functions as a weighting factor combining unit to combine the weighting factor set by the aforesaid first weight processing unit and the weighting factor set by the aforesaid second weight processing unit.

Yet additionally, the weighting factor calculation processing unit 134 can set the weighting factors for the TPC commands from the respective base stations 100 equally at 1 in a case in which, for example, all the SIR values of the signals transmitted from the plurality of base stations 100 and measured by the aforesaid HS-SCCH demodulating/decoding unit 129 exceed the aforesaid threshold. This just corresponds to no implementation of the weight processing.

That is, the weighting factor calculation processing unit 134 also functions as a weighting combination control means to implement control on the availability or unavailability of the above-mentioned weighting combination processing according to the SIR value measured by the HS-SCCH demodulating/decoding unit 129.

With reference to a flow chart of FIG. 4, a description will be given hereinbelow of an operation of the mobile station 1 thus configured according to this embodiment.

First of all, in the mobile station 1, signals transmitted from the plurality of base stations 100 are inputted through a reception antenna (not shown) to the matched filters 119 and 120 and each subjected to the inverse spread processing through the use of the DPCH or CPICH channelization code so as to separate and extract DPCH and CPICH signals, with the DPCH received signal being inputted to the respective channel estimating units 121, 122 and the respective multipliers 123, 124 and the CPICH received signal being inputted to the channel estimating units 121 and 122.

Moreover, each of the channel estimating units 121 and 122 carries out required correlative operation processing on the DPCH received signal inputted from the matched filter 119 on the basis of the CPICH received signal (pilot signal) inputted from the matched filter 120 to a channel estimate for each antenna (Antenna 1, Antenna 2) with respect to the base stations 100-1 and 100-2, and the this channel estimate and the DPCH received signal obtained by the DPCH matched filter 119 are multiplied by the multipliers 123 and 124, thereby carrying out the channel compensation processing.

The received signals after this channel compensation are inputted to the RAKE combiners 125 and 126 and, after subjected to the RAKE combination processing, added (combined) by the adder 127 and further added (combined) to the signals (i.e., received signals from the other base stations 100), obtained in like manner in the other TPC processing units 101-2, by the adder 112 and still further channel-decoded by the channel decoder 113, thereby acquiring the received data.

The combined signal acquired by the adder 127 is inputted to the TPC symbol soft decision unit 128 to undergo the soft decision combination processing therein.

Figure 4:
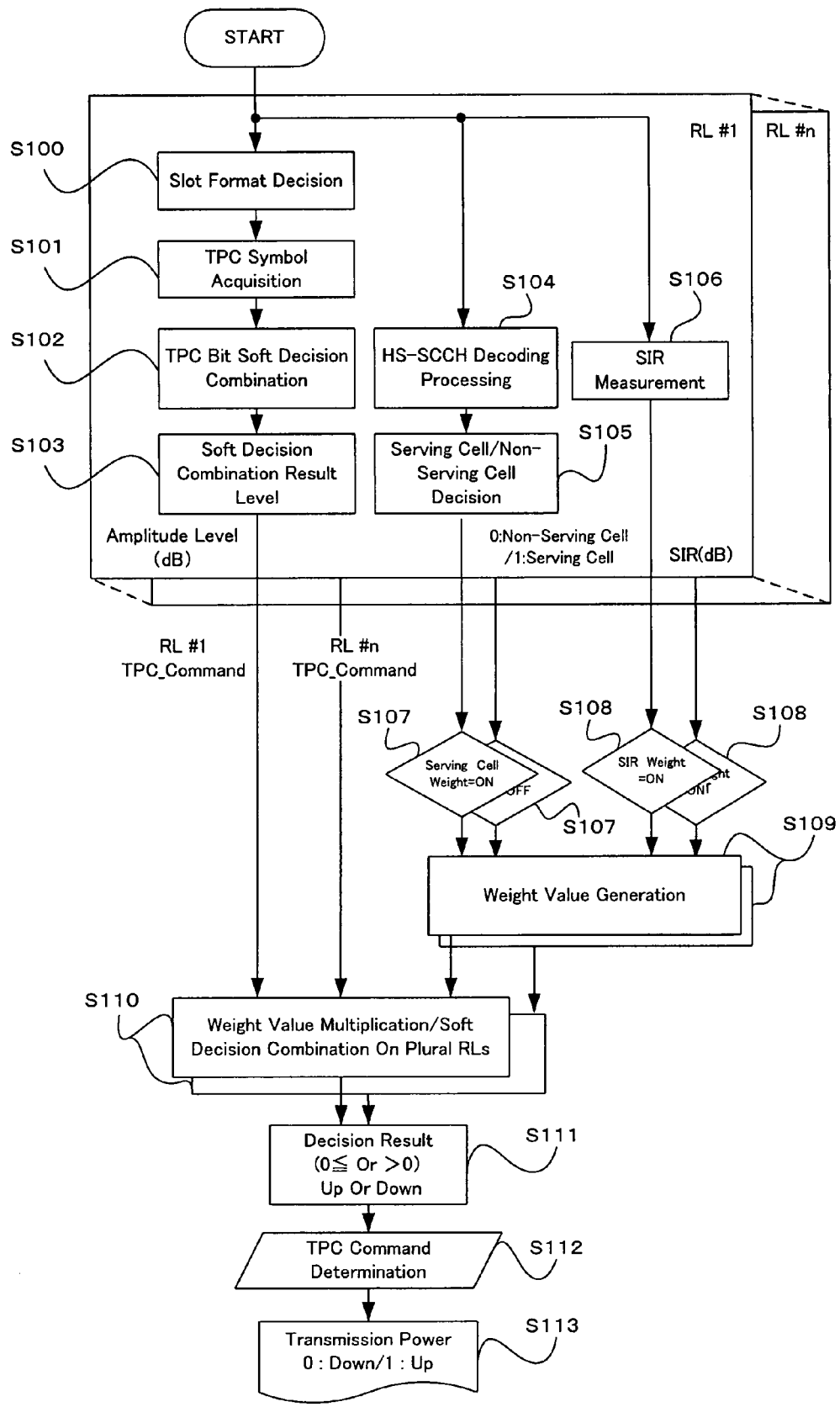
FIG. 4 is a flow chart useful for explaining an operation (transmission power control method) of the mobile station apparatus shown in FIG. 1.

Moreover, a slot format decision thereon is made by the TPC symbol soft decision unit 128 (step S100 in FIG. 4), and the soft decision combination is made with respect to a plurality of TPC symbols (steps S101 and S102 in FIG. 4) and the TPC commands from the radio links (RL#1 to #n: n denotes an integer equal to or more than 2 and corresponds to the number of base stations), obtained in this way, are outputted as the soft decision combination processing result (step S103 in FIG. 4).

On the other hand, a signal transmitted from the base station 100 is also inputted to the HS-SCCH demodulating/decoding unit 129 and the HS-PDSCH demodulating/decoding unit 130, and the S-SCCH demodulating/decoding unit 129 conducts the demodulating/decoding processing on the HS-SCCH signal (step S104 in FIG. 4), and the serving cell identifying unit 131 then makes a decision as to whether or not this base station 100 is a serving cell (step S105 in FIG. 4). For example, 0 indicative of the fact that it is not a serving cell or 1 indicative of a case that it is a serving cell is outputted as a result of the decision (identification). The HS-SCCH demodulating/decoding unit 129 carries out the measurement processing on an SIR value (dB) with respect to a signal received from the base station 100 (step S106 in FIG. 4).

Following this, the TPC weighting factor generating unit 118 sets the values (ON or OFF) of the SIR factor ON/OFF setting signal and the serving cell decision ON/OFF setting signal on the basis of the decision result (indicating whether this base station 100 is a serving cell) in the aforesaid step S105 and the measurement result (SIR value) in the aforesaid step S106 (steps S107 and S108 in FIG. 4).

Subsequently, the weighting factor calculation processing unit 134 generates weighting factors [Weight 1 ($\alpha$1), Weight 2 ($\alpha$2)] on the basis of the values of the SIR factor ON/OFF setting signal and the serving cell decision ON/OFF setting signal, the SIR value measured by the HS-SCCH demodulating/decoding unit 129, and others (step S109 in FIG. 4).

In addition, in the multipliers 114 and 115, the generated weighting factors are multiplied by the soft decision combination processing result outputted from the TPC symbol soft decision unit 128, and they are inputted to the TPC command combiner 116. The TPC command combiner 116 further combines (adds) the soft decision combination processing results as to the respective RL#i (i=1 to n), weighted by multiplying the weighting factors in this way (step S110 in FIG. 4), thereby generating a control signal $\Delta_{TPC}$.

That is, the TPC command combiner 116 generates a control signal ($\Delta_{TPC}$=1) for increasing the transmission power in the mobile station 1 when the combination result in the aforesaid step S110 is larger than 0 and generates a control signal ($\Delta_{TPC}$=0) for decreasing the transmission power in the mobile station 1 when the combination result in the aforesaid step S110 is equal to or smaller than 0 (steps S111 and S112 in FIG. 4), and outputs it to the transmission power control unit 132.

Thus, the transmission power control unit 132 actually controls the transmission power to the mobile station 1 according to the aforesaid control signal ($\Delta_{TPC}$) from the TPC command combiner 116 (step S113 in FIG. 4).

Secondly, referring to FIG. 3 showing a pattern of the weighting factor generation processing based on the above-mentioned various types of setting signals, a concrete description will be given hereinbelow of an operation of the weighting factor calculation processing unit 134.

As shown in FIG. 3, in this embodiment, for example, four modes of MODE 1 to MODE 4, which will be described hereinbelow, exist according to ON/OFF patterns of the SIR factor ON/OFF setting signal and the serving cell decision ON/OFF setting signal, and the TPC weighting factor generating unit 118 can make the switching among the aforesaid modes on the basis of the above-mentioned various types of setting signals or the like, thus carrying out various weighting factor generation processing.

(1) About MODE 1

The MODE 1 signifies an operation mode in the weighting factor calculation processing unit 134 when both the SIR factor ON/OFF setting signal and the serving cell decision ON/OFF setting signal are in the OFF state.

In this MODE 1, the weighting factor calculation processing unit 134 outputs, as the TPC weighting factor, a predetermined value previously set in a storage unit (not shown) such as a memory built in the TPC weighting factor generating unit 118 without depending upon the SIR value (reception quality measurement result) of a signal received from each of the base stations 100 and the identification result indicative of whether or not this base station 100 is a serving cell. In this case, for example, let it be assumed that W1 and W2 are respectively set as the TPC weighting factors α1 and α2 to be added to the soft decision combination results from the base stations 100-1 and 100-2.

Therefore, when the soft decision combination processing results obtained by the TPC symbol soft decision units 128 of the TPC processing units 101-1 and 101-2 are respectively taken as P1 and P2, the soft decision combination processing results in the case of the implementation of the weight processing according to this MODE 1 become P1×W1+P2×W2.

The values of the TPC weighting factors W1 and W2 in this MODE 1 can be freely set by a user and, for example, in a case in which it is previously clear that there is a tendency that the distance between the base station 100-1 and the mobile station 1 is longer than the distance between the base station 100-2 and the mobile station 1 and the communication quality in the mobile station 1 relative to the base station 100-1 is below the communication quality relative to the base station 100-2, the TPC weighting factor W1 to be multiplied for the soft decision combination result in the mobile station 1 with respect to the TPC command transmitted from the base station 100-1 is set at a lower value than the TPC weighting factor W2 to be multiplied for the soft decision combination result in the mobile station 1 with respect to the TPC command transmitted from the base station 100-2.

This can reduce the influence by, for example, the bit error of the TPC command from the base station 100-1 having a low reliability, which enables the transmission power control having a high reliability.

In addition, for example, in a case in which it is previously known that the reliability in communication quality with respect to all the base stations 100-1 and 100-2 is high, by setting both W1 and W2 at 1, it is also possible to carry out the transmission power control so as not to conduct the weight processing. In this case, the simplification and speeding-up of the weight processing are achievable.

Figure 5A:
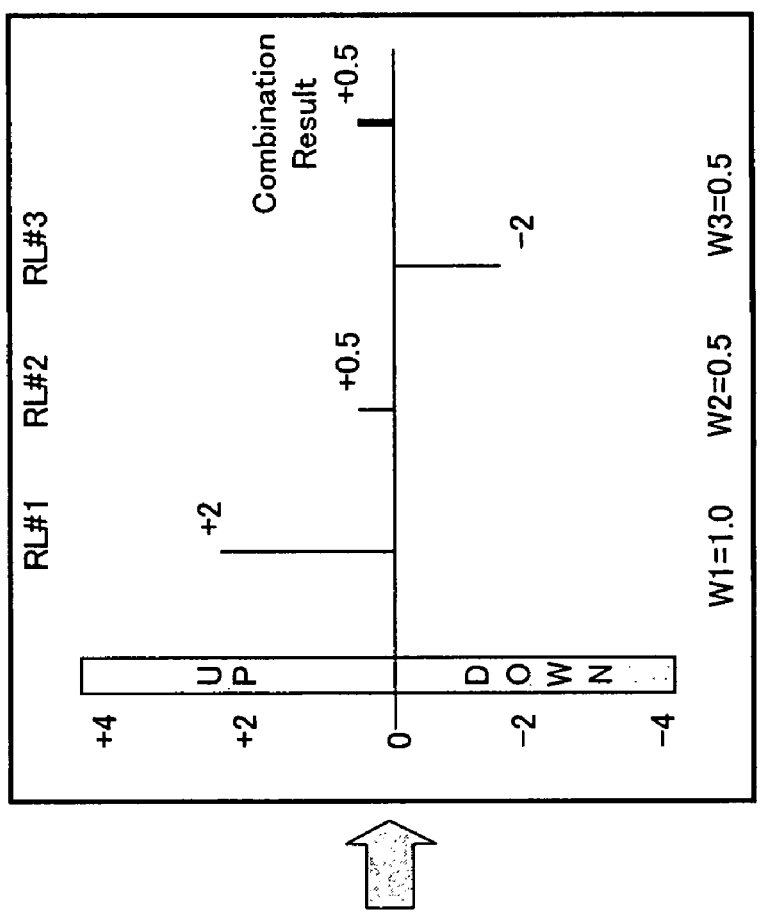
FIG. 5(a) is an illustration of one example of a result of soft decision combination before the implementation of weight processing according to this embodiment.
Figure 5B:
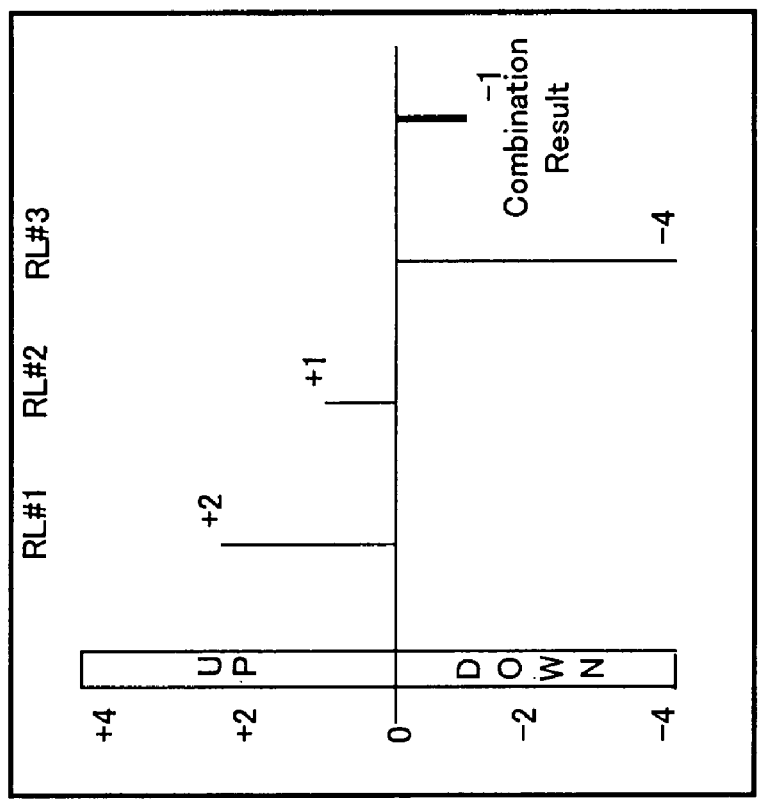
FIG. 5(b) is an illustration of one example of a result of soft decision combination after the implementation of the weight processing according to this embodiment.

Referring to FIGS. 5(*a*) and 5(*b*), a concrete description will be given hereinbelow of the effects and advantages of the above-described weight processing.

FIG. 5(*a*) is an illustration of an example of values (magnitudes) of TPC commands from the respective base stations (RL#1, RL#2, RL#3) (that is, in this case, the base stations are three in number) before the weight processing and a result of combination (addition) thereof.

In the example shown in FIG. 5(*a*), the TPC command value from the RL#1 is taken as "+2", the TPC command value from the RL#2 is taken as "+1" and the TPC command value from the RL#3 is taken as "−4", and the TPC command from the RL#3 is recognized in error in the mobile station 1.

In this case, the soft decision combination result on the TPC commands from the respective base stations 100 (RL#1 to RL#3) becomes (+2)+(+1)+(−4)=−1 and, since the combination result is smaller than 0, the control for decreasing the transmission power takes place.

On the other hand, FIG. 5(*b*) shows one example of values (magnitudes) of TPC commands from the respective base stations in the case of undergoing the weight processing according to this embodiment, the weighting factors W1, W2 and W3 to be multiplied for the TPC command values, and a result of combination (addition) of the TPC commands after the weight processing.

As well as the example shown in FIG. 5(*a*), also in the example shown in FIG. 5(*b*), the TPC command value from the RL#1 is taken as "+2", the TPC command value from the RL#2 is taken as "+1" and the TPC command value from the RL#3 is taken as "−4". Moreover, for example, let it be assumed that the weighting factors relative to RL#1, RL#2 and RL#3 are W1=1.0, W2=0.5 and W3=0.5, respectively. That is, this signifies the weight processing in a case in which it is previously known that the communication quality of the RL#1 is higher than those of the other RL#2 and RL#3.

In this case, the soft decision combination processing result on the TPC commands from RL#1 to RL#3 becomes (+2)×(1.0)+(+1)×(0.5)+(−4)×(0.5)=0.5 and, since the combination result is larger than 0, the control for increasing the transmission power takes place. Therefore, it is possible to carry out the intended normal transmission power control so as to increase (UP) the transmission power from the mobile station 1 to the base station 100 (up direction).

(2) About MODE 2

As shown in FIG. 3, the MODE 2 signifies an operation mode of the weighting factor calculation processing unit 134 in a case in which the SIR factor ON/OFF setting signal is in the OFF state while the service cell decision ON/OFF setting signal is in the ON state and, in this mode, the weighting factor calculation processing unit 134 is made to generate the TPC weighting factor on the basis of whether or not the base station 100 forming a communication partner is a serving cell.

In this case, in an example of a case in which the base station 100-1 (RL#1) is a serving cell, a weighting factor (serving cell weighting factor) for a TPC command received from the serving cell is taken as β (Serving Cell Weight Ratio). In this connection, with respect to the weighting factor relative to the other base station 100 which is not a serving cell, as in the case of the MODE 1, a predetermined value previously set in a storage unit (not shown) such as a memory internally included in the TPC weighting factor generating unit 118 is outputted as a TPC weighting factor (in this case, W2).

Therefore, in a case in which the soft decision combination processing results from the base stations RL#1 and RL#2 are taken as P1 and P2, respectively, and the RL#1 is a serving cell, the soft decision combination processing result when the weight processing is conducted according to this MODE 2 becomes P1×β+P2×W2.

In this case, β is set at a value higher than the other weight W2 (for example, W2 is set at 0.2 while β is set at 1.2). This is because the communication quality of the RL#1 forming a serving cell is generally superior to the communication quality of the other RL and a possibility that the TPC command received from the RL#1 is recognized in error by the mobile station 1 is extremely low.

Moreover, even in a case in which the communication quality of the RL#1 which is a serving cell becomes lower than that of the other RL (for example, RL#2), since the RL#2 becomes a new serving cell by the handover processing to the other RL#2, the weighting factor β having a value higher than the weighting factor for the other RL can always be set with respect to the TPC command from the RL having a high reliability.

Accordingly, for example, in a situation in which packet communications are principally made such that communications are mainly made with respect to the serving cell, an operation mode according to this MODE 2 is selected (the SIR factor ON/OFF setting signal takes the OFF state and the serving cell decision ON/OFF setting signal takes the ON state), which enables the transmission power control in the mobile station 1 to be implemented more accurately and stably.

(3) About MODE 3

In a situation in which a packet communication is principally made between the mobile station 1 and the base station 100, in the case of HSDPA, since the base station 100 forming a serving cell is one in number, although the reliable transmission power control becomes feasible by selecting the operation mode according to the aforesaid MODE 2, in a situation in which an audio call service (including services such as visual telephone services capable of carrying out both packet communication and audio call communication) is performed, there is a case of combining and receiving signals from a plurality of base stations 100.

In this case, there can be a need to execute the transmission power control while relying upon the TPC command from the other base station 100 which is not a serving cell. In a case in which the foregoing MODE 2 is selected in such a situation, even if the other base station 100 which is not the serving cell gives an instruction for "decreasing the power (DOWN)", it is considered that, since the weight is set at a low value, the transmission power control in the mobile station 1 continues the transmission of high without complying with this instruction.

Accordingly, this MODE 3 generates a weighting factor on the basis of a result of the SIR measurement on a signal, transmitted from each base station 100, in the mobile station 1.

That is, as shown in FIG. 3, this mode (MODE 3) is an operation mode of the weighting factor calculation processing unit 134 when the SIR factor ON/OFF setting signal is in the ON state while the serving cell decision ON/OFF setting signal is in the OFF state and, in this MODE 3, the weighting factor calculation processing unit 134 generates a TPC weighting factor on the basis of the downlink reception quality (SIR measurement result) with respect to the base station 100 which is a communication partner.

In this case, for example, as shown in FIG. 3, the SIR weight ratio to be combined (multiplied) with an SIR measurement result S1 on a signal from the base station 100-1 (RL#1) is set at $\gamma 1$, and the SIR weight ratio to be combined (multiplied) with an SIR measurement result S2 on a signal from the base station 100-2 (RL#2) is set at $\gamma 2$. These SIR weight ratios $\gamma 1$ and $\gamma 2$ are factors (coefficients) to be used for converting the SIR measurement results S1 and S2 into weighting factors and, in this MODE 3, for example, $\gamma 1 = \gamma 2$.

That is, when the soft decision combination processing results from RL#1 and RL#2 are respectively taken as P1 and P2, the soft decision combination processing result when subjected to the weight processing according to this MODE 3 becomes $P1 \times (S1 \times \gamma 1) + P2 \times (S2 \times \gamma 2)$.

Figure 6B:
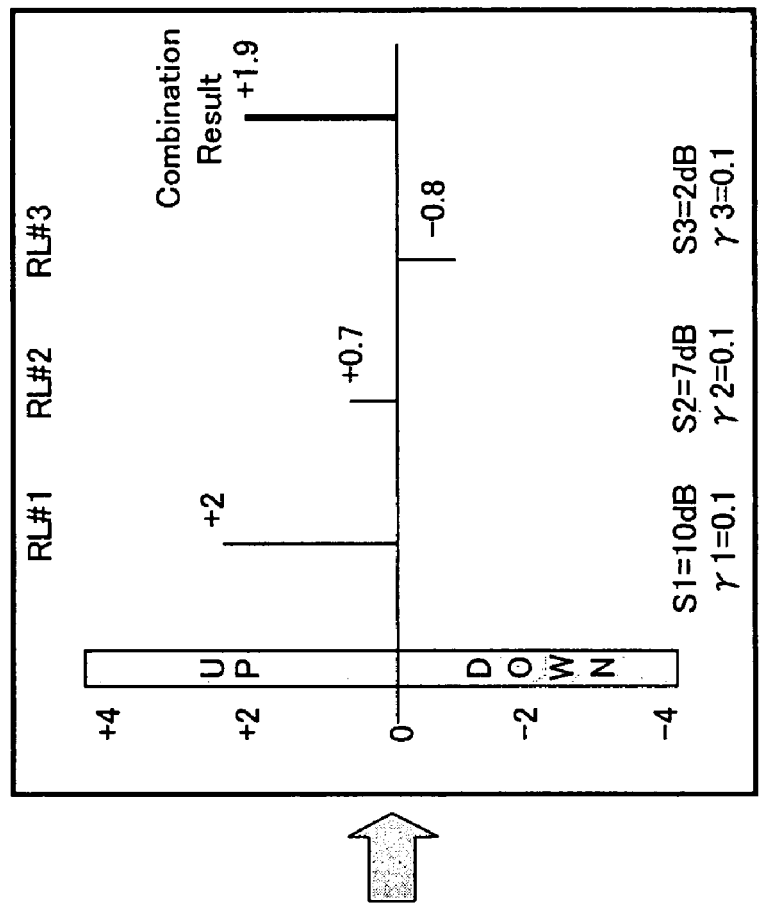
FIG. 6(b) is an illustration of one example of a result of soft decision combination after the implementation of the weight processing according to this embodiment.
Figure 6A:
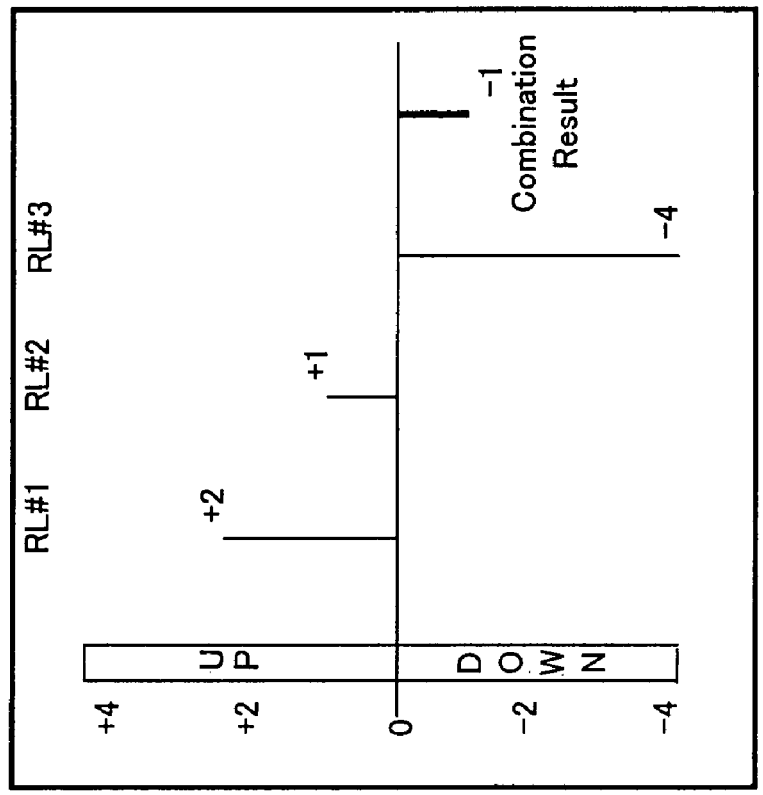
FIG. 6(a) is an illustration of one example of a result of soft decision combination before the implementation of weight processing according to this embodiment.
Figure 8:
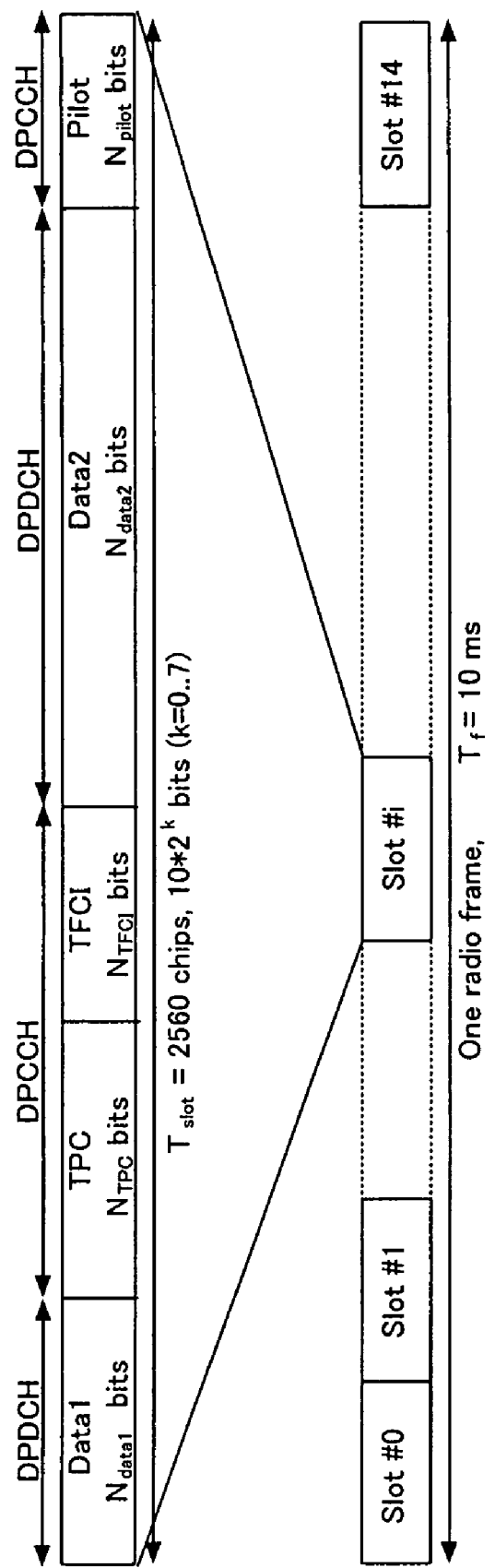
FIG. 8 is an illustration of a frame format for TPC bits.
Figure 10:
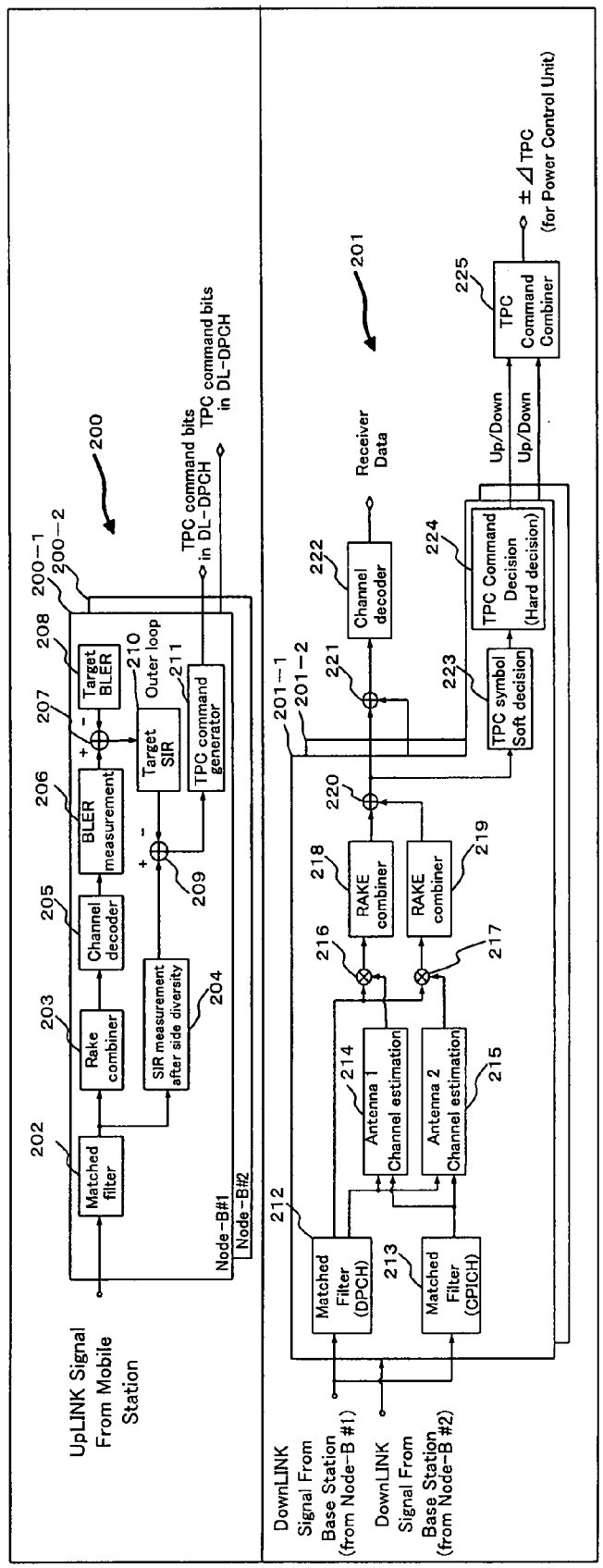
FIG. 10 is a block diagram showing a conventional configuration for TPC processing in a base station and a mobile station.
Figures 11A, 11B:
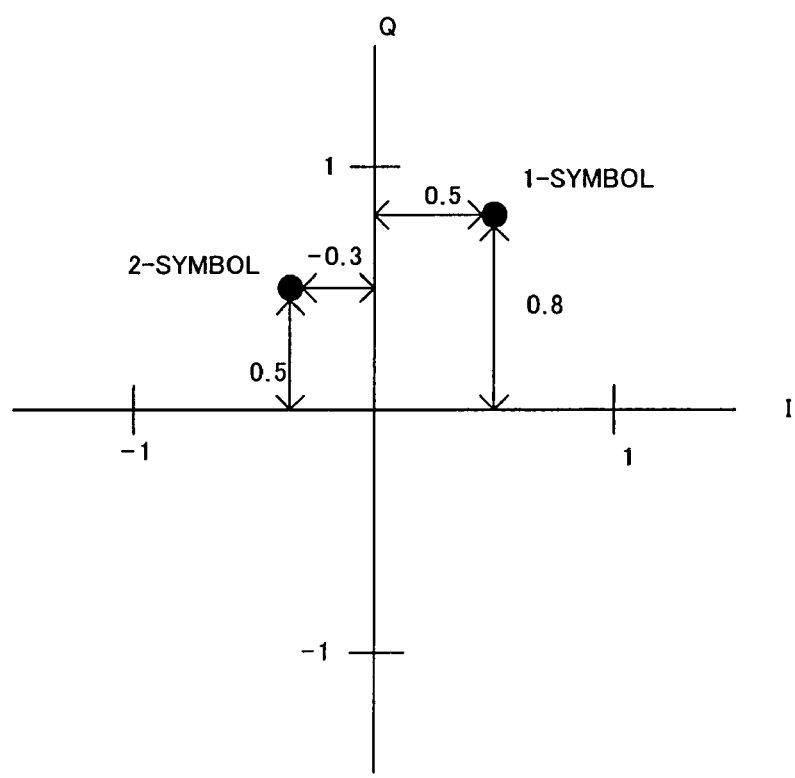
FIG. 11(a) is an illustration of one example of TPC symbol values.
FIG. 11(b) is an illustration of a reception side I-Q constellation in the one example of the TPC symbol values shown in FIG. 11(a)
Figure 14:
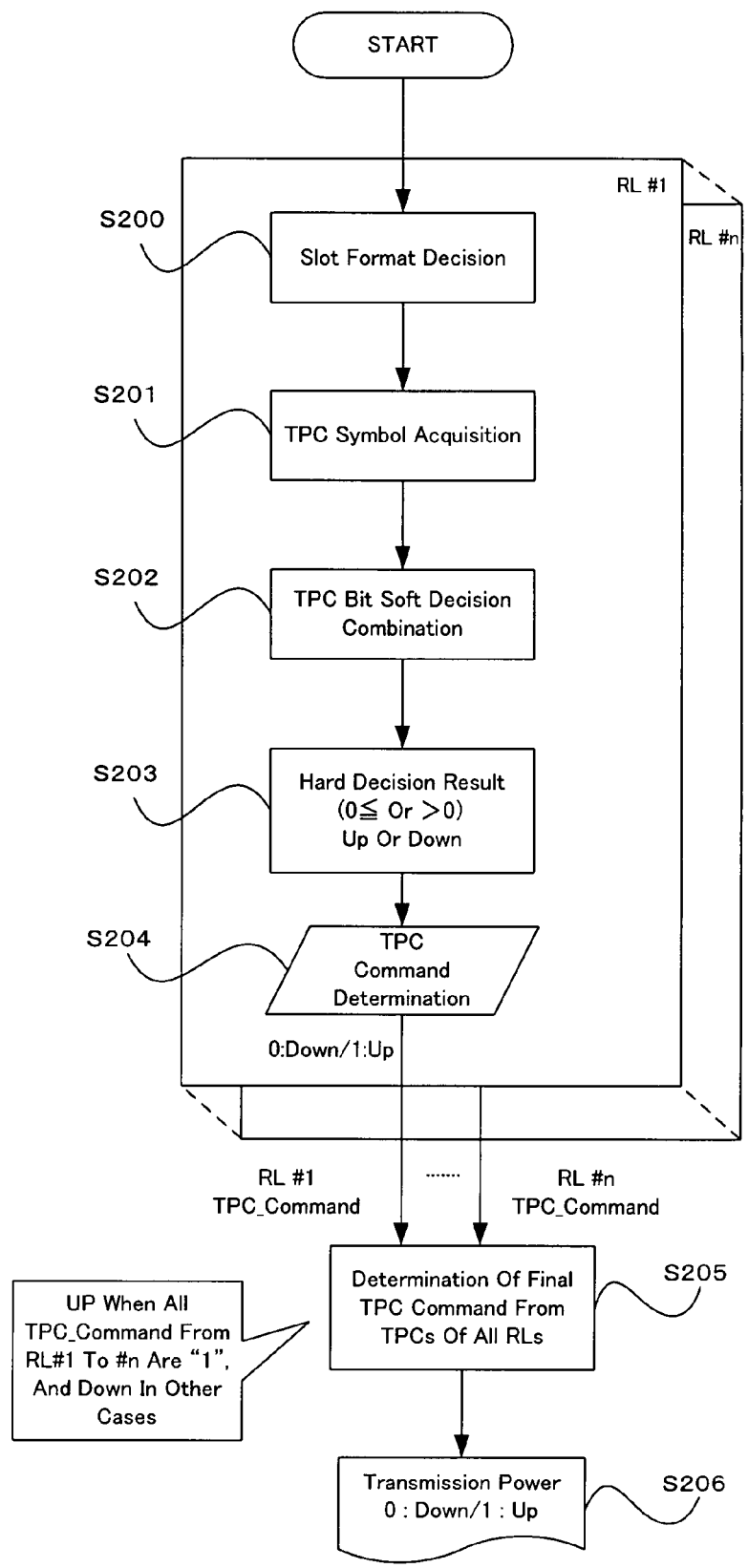
FIG. 14 is a flow chart for explaining a conventional transmission power control method.
Figure 15:
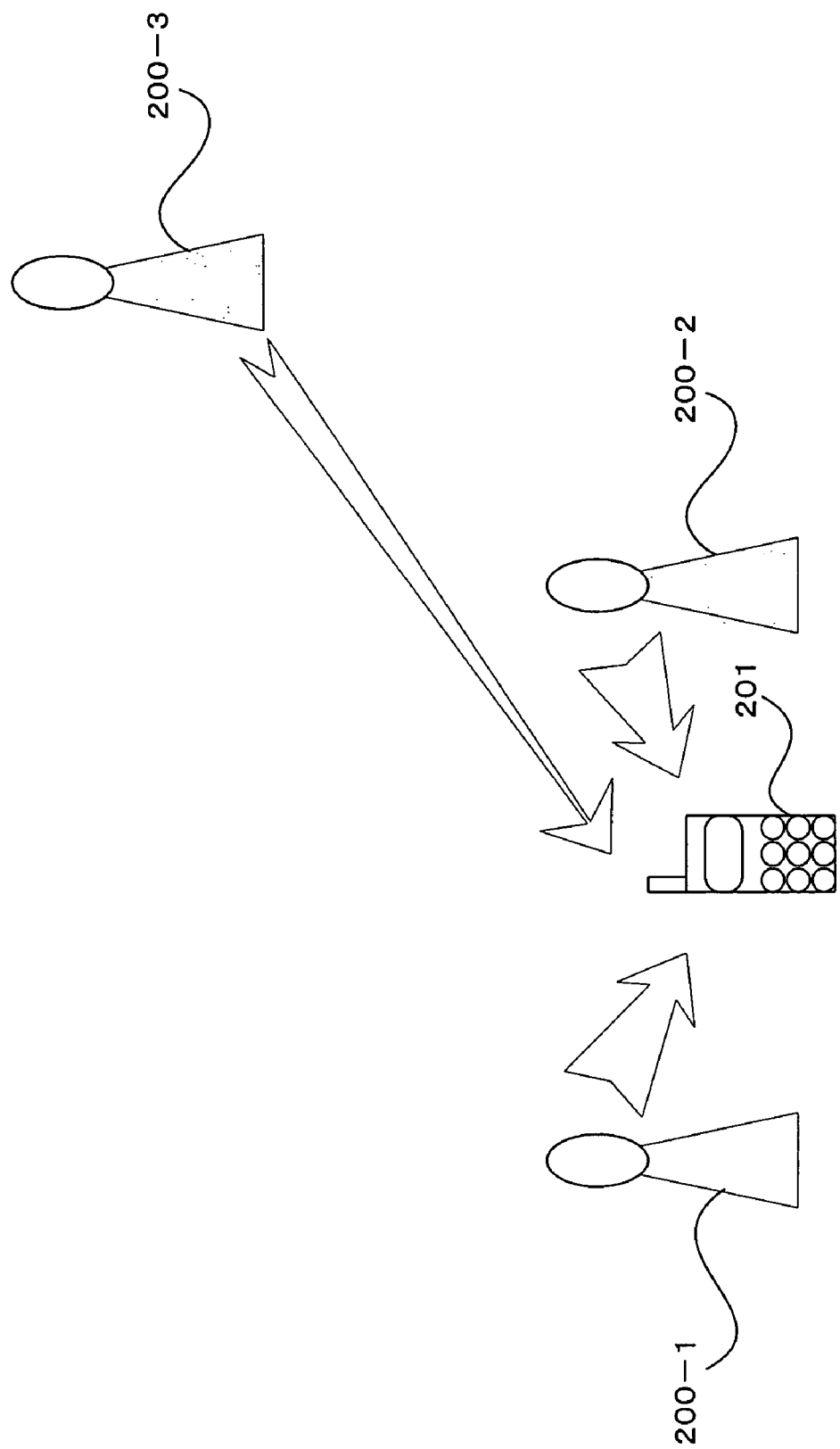
FIG. 15 is an illustration of one example of the positional relationship between a mobile station and a base station.

Referring to FIGS. 6(a) and 6(b), a concrete description will be given hereinbelow of the effects and advantages of the above-described weight processing.

FIG. 6(a) is an illustration of an example of values (magnitudes) of TPC commands from the respective base stations (RL#1, RL#2, RL#3) (that is, also in this case, the base stations are three in number) before the weight processing and a result of combination (addition) thereof.

In the example shown in FIG. 6(a), the TPC command value from the RL#1 is taken as "+2", the TPC command value from the RL#2 is taken as "+1" and the TPC command value from the RL#3 is taken as "−4", and the TPC command from the RL#3 is recognized in error in the mobile station 1.

In this case, the soft decision combination result on the TPC commands from RL#1 to RL#3 becomes $(+2)+(+1)+(-4)=-1$ and, since the combination result is smaller than 0, the control for decreasing the transmission power takes place.

On the other hand, FIG. 6(b) shows values (magnitudes) of TPC commands from RL#1, RL#2 and RL#3 in the case of undergoing the weight processing according to this MODE 3, the SIR measurement results S1, S2 and S3 on RL#1, RL#2 and RL#3, the SIR weight ratios $\gamma 1$, $\gamma 2$ and $\gamma 3$ relative to the respective SIR measurement results, and a result of combination (addition) of the TPC commands after the weight processing.

As well as the example shown in FIG. 6(a), also in the example shown in FIG. 6(b), the TPC command value from the RL#1 is taken as "+2", the TPC command value from the RL#2 is taken as "+1" and the TPC command value from the RL#3 is taken as "−4". Moreover, let it be assumed that the SIR measurement results on RL#1, RL#2 and RL#3 are taken as S1=10 dB, S2=7 dB and S3=2 dB, respectively, and the SIR weight ratio to be combined with the respective SIR measurement results is taken as $\gamma 1 = \gamma 2 = \gamma 3 = 0.1$.

In this case, the soft decision combination processing result on the TPC commands from RL#1, RL#2 and RL#3 becomes $(+2) \times (10 \times 0.1) + (+1) \times (7 \times 0.1) + (-4) \times (2 \times 0.1) = 1.9$ and, since the combination result is larger than 0, the control for increasing the transmission power takes place. Therefore, it is possible to carry out the intended normal transmission power control so as to increase (UP) the transmission power of the uplink from the mobile station 1 to the base station 100.

Although, for example, the aforesaid values of $\gamma 1$ to $\gamma 3$ are stored as a conversion table between SIR and weighting factor in a storage unit (not shown) such as a memory internally included in the TPC weighting factor generating unit 118, as a different example, for example, it is considerable to employ a method of making an association with the SIR value and the TPC bit error rate.

For example, in a case in which an association is made with the SIR value and the TPC bit error rate, if the TPC bit error rate stands at 80% in the case of SIR=2 dB, for the reception of a correct TPC command result, a weight factor is generated as 0.2 in a distribution from 0 to 1.

In addition, according to this MODE 3, the TPC weighting factor generating unit 118 can use a function as the aforesaid selection unit to, according to the SIR measurement result on each of the base stations 100, selectively carry out an operation of the weighting factor calculation processing unit 134 at the selection of the MODE 2 and an operation of the weighting factor calculation processing unit 134 at the selection of the MODE 3.

For example, the weighting factor calculation processing unit 134 counts, of the SIR measurement results on the respective base stations 100, the number of base stations each an SIR exceeding a predetermined threshold (reception quality) so that, when that base station is one in number, the MODE 2 is selected so as to increase the weighting factor for only the TPC command from the base station (serving cell) having the highest SIR and, for example, when the base stations each having an SIR exceeding the predetermined threshold (reception quality) are two or more in number, the MODE 3 is selected for the weighting factor generation.

Thus, for example, in a case in which, for example, of the SIR measurement results on the respective base stations 100, only the SIR measurement result on a single base station 100 is excellent and difficulty is experienced in making a communication with the base stations 100 other than this base station 100 (for example, in the case of a service which can combine and receive signals from a plurality of base stations 100 like audio call), the transmission power control based on the weighting factor determined according to the MODE 3 works effectively. On the other hand, for example, when all the SIR measurement results on the respective base stations 100 are good and evenly in the balanced condition, the transmission power control based on the weighting factor calculated according to the MODE 2 is effective. For this reason, as mentioned above, when the weighting factor calculation processing unit 134 is put into operation while making the switching between the MODE 2 and the MODE 3, further stable operation for the transmission power control is achievable.

Moreover, in a case in which all the SIR measurement results on the respective base stations 100 have a high level exceeding a given threshold (for example, equal in level to the SIR of the serving cell), the possibility of occurrence of mistaken recognition on a TPC command from the base station 100 is extremely low in the mobile station 1 and, in such a case, the weighting factor calculation processing unit 134 can use a function as the above-mentioned weighting combination means to combine the TPC commands, without carrying out the weight processing, for implementing the transmission power control, thereby realizing the normal transmission power control. When all the weighting factors to be multiplied for the TPC commands from the respective base stations 100 are set at 1, the operation can be conducted as if the weight processing were not implemented. This enables appropriate transmission power control to be realized according to the positional relationship (relationship in reception quality) between the mobile station 1 and the base stations 100 while reducing the load of the weighting combination processing.

(4) About MODE 4

This MODE 4 corresponds to a mode for determining a weight factor by a combined use of the operation of the weighting factor calculation processing unit 134 at the selection of the aforesaid MODE 2 and the operation of the weight factor calculation processing unit 134 at the selection of the aforesaid MODE 3.

That is, as shown in FIG. 3, this MODE 4 signifies an operation mode of the weighting factor calculation processing unit 134 when the SIR factor ON/OFF setting signal is in the ON state and the serving cell decision ON/OFF setting signal is in the ON state and, in this MODE 4, the weighting factor calculation processing unit 134 is made to generate a TPC weighting factor depending upon the reception quality (SIR measurement result) related to the base station forming a communication partner and the identification result representative of whether or not the base station 100 acting as the communication partner is a serving cell.

That is, when the serving cell weighting factor is taken as $\beta$, the SIR weight ratios to be multiplied by the SIR measurement results S1 and S2 related to RL#1 and RL#2 are respectively taken as $\gamma1$ and $\gamma2$ and the soft decision combination processing results from RL#1 and RL#2 are respectively taken as P1 and P2, the soft decision combination processing results weighting-processed according to this MODE 4 becomes $P1 \times \{\beta \times (S1 \times \gamma1)\} + P2 \times (S2 \times \gamma2)$.

Referring again to FIG. 6(b), a concrete description will be given hereinbelow of the effects and advantages of the above-described weight processing.

In the example shown in FIG. 6(b), a description will be given of the weighting combination processing according to this MODE 4 when the RL#1 is a serving cell. For example, let it be assumed that the SIR measurement results related to RL#1, RL#2 and RL#3 are respectively S1=10 dB, S2=7 dB and S3=2 dB and the SIR weight ratios to be combined with the respective SIR measurement results are $\gamma1=\gamma2=\gamma3=0.1$ and the serving cell weighting factor is $\beta=1.0$.

In this case, the soft decision combination result of the TPC commands from RL#1, RL#2 and RL#3 becomes $(+2) \times \{1.0 \times (10 \times 0.1)\} + (+1) \times (7 \times 0.1) + (-4) \times (2 \times 0.1) = 1.9$ and, since it is larger than 0, the control for increasing the transmission power is implemented, which permits the implementation of the intended normal transmission power control so as to increase (UP) the transmission power from the mobile station 1 to the base station 100 (up direction).

In the above-described example, although the same TPC command weighting combination result as that in the case of the aforesaid MODE 3 is acquired since the serving cell weighting factor is set at $\beta=1.0$, when $\beta$ is set at a higher value (for example, $\beta=1.5$), it is possible to further enhance the influence on the transmission power control based on the TPC command from the serving cell. This allows further stable and normal transmission power control and enables equalizing the transmission power control in a transient state at the handover during movement or in other states.

As described above, the mobile station apparatus and transmission power control method according to this embodiment can improve the decision accuracy in a mobile station with respect to a TPC command (power control information) from a base station to the mobile station and maintain the optimum transmission power.

The above-mentioned mobile station 1 is not always required to have all the various types of functions mentioned above. For example, there is no need for the mobile station 1 to have all the functions of MODEs 1 to 4 and, in this case, the functions which are not used in each of the MODEs can be omitted from the configurations shown in FIGS. 1 and 2.

It should be understood that the present invention is not limited to the above-described embodiment, and that it is intended to cover all changes and modifications of the embodiment of the invention herein which do not constitute departures from the spirit and scope of the invention.

What is claimed is:

1. A mobile station apparatus, which controls transmission power based on power control information received from a plurality of base station apparatuses, comprising:
   a weighting combination unit which makes a weighting combination among the plurality of power control information received from said plurality of base station apparatus; and
   a transmission power control unit which controls transmission power based on a result of the weighting combination by said weighting combination unit,
   wherein said weighting combination unit sets a weighting factor for the power control information from a serving base station apparatus of said plurality of base station apparatuses at a higher value than a weighting factor for the power control information from one or more of the other base station apparatuses.

2. The mobile station apparatus according to claim 1, wherein said weighting combination unit includes a first weight processing unit which sets a weighting factor for the power control information from at least one of said plurality of base station apparatuses at a higher value than a weighting factor for the power control information from one or more of the other base station apparatuses.

3. The mobile station apparatus according to claim 2, further comprising:
   a reception quality measuring unit which measures a quality of reception from each of said plurality of base station apparatuses; and
   a weighting combination control unit which controls availability or unavailability of the weighting combination by said weighting combination unit according to a result of the measurement by said reception quality measuring unit.

4. The mobile station apparatus according to claim 1, further comprising a reception quality measuring unit which measures a quality of reception from each of said plurality of base station apparatuses, said weighting combination unit includes a second weight processing unit which, according to results of the reception quality measurement by said reception quality measuring unit, sets a weighting factor for the power control information from a first base station apparatus providing a high reception quality at a higher value than a weighting factor for a second base station apparatus providing a low reception quality.

5. The mobile station apparatus according to claim 4, further comprising:

a reception quality measuring unit which measures a quality of reception from each of said plurality of base station apparatuses; and a weighting combination control unit which controls availability or unavailability of the weighting combination by said weighting combination unit according to a result of the measurement by said reception quality measuring unit.

6. The mobile station apparatus according to claim 1, further comprising a reception quality measuring unit which measures a quality of reception from each of said plurality of base station apparatuses, said weighting combination unit includes:

a first weight processing unit which sets a weighting factor for the power control information from at least one of said plurality of base station apparatuses at a higher value than a weighting factor for the power control information from one or more of the other base station apparatuses;

a second weight processing unit which, according to results of the reception quality measurement by said reception quality measuring unit, sets a weighting factor for the power control information from a first base station apparatus providing a high reception quality at a higher value than a weighting factor for a second base station apparatus providing a low reception quality; and a selection unit which selects one of said first weight processing unit and said second weight processing unit, which is to be put into operation, based on the number of base station apparatuses providing a reception quality, measured by said reception quality measuring unit, exceeding a predetermined threshold.

7. The mobile station apparatus according to claim 6, further comprising:

a reception quality measuring unit which measures a quality of reception from each of said plurality of base station apparatuses; and a weighting combination control unit which controls availability or unavailability of the weighting combination by said weighting combination unit according to a result of the measurement by said reception quality measuring unit.

8. The mobile station apparatus according to claim 6, wherein said selection unit selects said first weight processing unit when said base station apparatuses exceeding said threshold is one in number, and selects said second weight processing unit when said base station apparatuses exceeding said threshold are two or more in number.

9. The mobile station apparatus according to claim 8, further comprising:

a reception quality measuring unit which measures a quality of reception from each of said plurality of base station apparatuses; and a weighting combination control unit which controls availability or unavailability of the weighting combination by said weighting combination unit according to a result of the measurement by said reception quality measuring unit.

10. The mobile station apparatus according to claim 1, further comprising reception quality measuring unit which measures a quality of reception from each of said plurality of base station apparatuses, said weighting combination unit includes:

a first weight processing unit which sets a weighting factor for the power control information from at least one of said plurality of base station apparatuses at a higher value than a weighting factor for the power control information from one or more of the other base station apparatuses;

a second weight processing unit which, according to results of the reception quality measurement by said reception quality measuring unit, sets a weighting factor for the power control information from a first base station apparatus providing a high reception quality at a higher value than a weighting factor for a second base station apparatus providing a low reception quality; and a weighting factor combining unit for combining the weighting factor set by said first weight processing unit and the weighting factor set by said second weight processing unit.

11. The mobile station apparatus according to claim 10, further comprising:

a reception quality measuring unit which measures a quality of reception from each of said plurality of base station apparatuses; and a weighting combination control unit which controls availability or unavailability of the weighting combination by said weighting combination unit according to a result of the measurement by said reception quality measuring unit.

12. The mobile station apparatus according to claim 1, further comprising:

a reception quality measuring unit which measures a quality of reception from each of said plurality of base station apparatuses; and a weighting combination control unit which controls availability or unavailability of the weighting combination by said weighting combination unit according to a result of the measurement by said reception quality measuring unit.

13. A transmission power control method of, in a mobile station apparatus, controlling transmission power based on power control information received from each of said plurality of base station apparatuses, the transmission power control method comprising;

performing a weighting-combination among power control information received from said plurality of base station apparatuses;

controlling the transmission power based on a result of the weighting-combination; and wherein, in performing the weighting combination, a weighting factor for the power control information from a serving base station apparatus of said plurality of base station apparatuses is set at a higher value than a weighting factor for the power control information from one or more of the other base station apparatuses.

14. The transmission power control method according to claim 13, wherein said mobile station apparatus sets a weighting factor for the power control information from at least one of said plurality of base station apparatuses at a higher value than a weighting factor for the power control information from one or more of the other base station apparatuses.

15. The transmission power control method according to claim 14, further comprising:
measuring a quality of reception from each of said plurality of base station apparatuses; and
controlling availability or unavailability of the weighting combination according to a result of the measurement of the reception quality.

16. The transmission power control method according to claim 13, wherein a quality of reception from each of said plurality of base station apparatuses is measured so as to set a weighting factor for the power control information from a first base station apparatus providing a high measured reception quality at a higher value than a weighting factor for a second base station apparatus providing a low measured reception quality.

17. The transmission power control method according to claim 13, wherein a quality of reception from each of said plurality of base station apparatuses is measured so as to, on the basis of the number of base station apparatuses each providing a measured reception quality exceeding a predetermined threshold, make a selection between a first weight processing mode of setting a weighting factor for the power control information from at least one of said plurality of base station apparatuses at a higher value than a weighting factor for the power control information from one or more of the other base station apparatuses and a second weight processing mode of, according to results of the reception quality measurement, setting a weighting factor for the power control information from a first base station apparatus providing a high reception quality at a higher value than a weighting factor for a second base station apparatus providing a low reception quality.

18. The transmission power control method according to claim 17, wherein said first weight processing mode is selected when said base station apparatus exceeding said threshold is one in number and said second weight processing mode is selected when said base station apparatuses exceeding said threshold are two or more in number.

19. The transmission power control method in a according to claim 13, further comprising:
measuring a quality of reception from each of said plurality of base station apparatuses;
in a first weight processing mode, setting a weighting factor for the power control information from at least one of said plurality of base station apparatuses at a higher value than a weighting factor for the power control information from one or more of the other base station apparatuses, and in a second weight processing mode, according to results of the reception quality measurement, setting a weighting factor for the power control information from a first base station apparatus providing a high reception quality at a higher value than a weighting factor for a second base station apparatus providing a low reception quality; and
combining the weighting factor set by said first weight processing mode and the weighting factor set by said second weight processing mode.

20. The transmission power control method according to claim 13, further comprising:
measuring a quality of reception from each of said plurality of base station apparatuses; and
controlling availability or unavailability of the weighting combination according to a result of the measurement of the reception quality.

* * * * *